(12) United States Patent
Seo et al.

(10) Patent No.: US 9,775,135 B2
(45) Date of Patent: Sep. 26, 2017

(54) METHOD AND DEVICE FOR COMMUNICATING DEVICE-TO-DEVICE

(75) Inventors: Hanbyul Seo, Anyang-si (KR); Daewon Lee, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 14/003,247

(22) PCT Filed: Mar. 15, 2012

(86) PCT No.: PCT/KR2012/001891
§ 371 (c)(1),
(2), (4) Date: Nov. 20, 2013

(87) PCT Pub. No.: WO2012/128505
PCT Pub. Date: Sep. 27, 2012

(65) Prior Publication Data
US 2014/0064203 A1 Mar. 6, 2014

Related U.S. Application Data

(60) Provisional application No. 61/453,967, filed on Mar. 18, 2011, provisional application No. 61/475,642,
(Continued)

(51) Int. Cl.
H04W 72/04 (2009.01)
H04W 28/06 (2009.01)
(Continued)

(52) U.S. Cl.
CPC ....... *H04W 72/0406* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS

2008/0089359 A1   4/2008  Yang et al.
2010/0080155 A1*  4/2010  Suzuki ............... H04W 4/20
                                                   370/310
(Continued)

FOREIGN PATENT DOCUMENTS

KR  1020090062435 A  6/2009
WO     2008005922 A2  1/2008
(Continued)

OTHER PUBLICATIONS

Ericsson: "E-UTRAN random access procedure C-RNTI assignment and HARQ on message 4", 3GPP Draft; R2-070363, 3rd Generation Partnership Project (3GPP), Mobile Competence Centre; 650, Route Des Lucioles; F-06921 Sophia-Antipolis Cedex; France, vol. RAN WG2, No. Sorrento, Italy; Jan. 24, 2007, Jan. 24, 2007, XP050133441.
(Continued)

*Primary Examiner* — Christopher Crutchfield
*Assistant Examiner* — Alan Lindenbaum
(74) *Attorney, Agent, or Firm* — Dentons US LLP

(57) ABSTRACT

The present invention relates to a wireless communication system, and more specifically, to a method and a device for communicating device-to-device. The method for a first device to transmit a signal to a second device according to one embodiment of the present invention enables the first device to request to a base station a resource allocation for transmitting the signal to the second device, receive from the base station scheduling information for transmitting the signal to the second device, and the signal can be transmitted from the first device to the second device on the basis of the scheduling information, wherein the scheduling information
(Continued)

includes information on an uplink resource for transmitting the signal from the first device to the second device.

19 Claims, 16 Drawing Sheets

Related U.S. Application Data filed on Apr. 14, 2011, provisional application No. 61/537,039, filed on Sep. 20, 2011.

(51) Int. Cl.
| | |
|---|---|
| *H04L 1/18* | (2006.01) |
| *H04W 72/12* | (2009.01) |
| *H04W 92/18* | (2009.01) |
| *H04W 74/08* | (2009.01) |

(52) U.S. Cl.
CPC .......... *H04W 28/06* (2013.01); *H04W 72/042* (2013.01); *H04W 72/0413* (2013.01); *H04W 72/1289* (2013.01); *H04W 74/0833* (2013.01); *H04W 92/18* (2013.01)

(56) References Cited

U.S. PATENT DOCUMENTS

| | | | |
|---|---|---|---|
| 2010/0093364 A1* | 4/2010 | Ribeiro et al. ............. 455/452.2 |
| 2011/0103317 A1* | 5/2011 | Ribeiro et al. ................ 370/329 |
| 2011/0159799 A1* | 6/2011 | Chen et al. .................. 455/3.01 |
| 2011/0317569 A1* | 12/2011 | Kneckt ............ H04W 74/0833 370/252 |
| 2012/0077510 A1* | 3/2012 | Chen ..................... H04W 28/26 455/452.1 |
| 2012/0129540 A1* | 5/2012 | Hakola ............... H04W 72/042 455/450 |

FOREIGN PATENT DOCUMENTS

| | | |
|---|---|---|
| WO | 2009138820 A1 | 11/2009 |
| WO | 2011015250 A1 | 2/2011 |

OTHER PUBLICATIONS

Klaus Doppler et al., Device-to-Device Communications as an Underlay to LTE-Advanced Networks, IEEE Communications Magazine, Dec. 2009, pp. 42-29.
Huawei: "Non-synchronized Random Access Procedure", 3GPP TSG RAN WG1 LTE Ad Hoc, R1-061856, Jun. 27-30, 2006.

* cited by examiner

FIG. 5
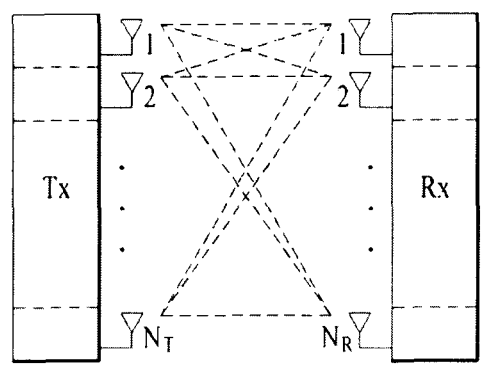
(a)
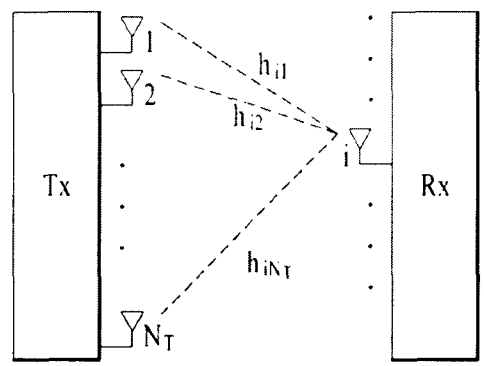
(b)

FIG. 9
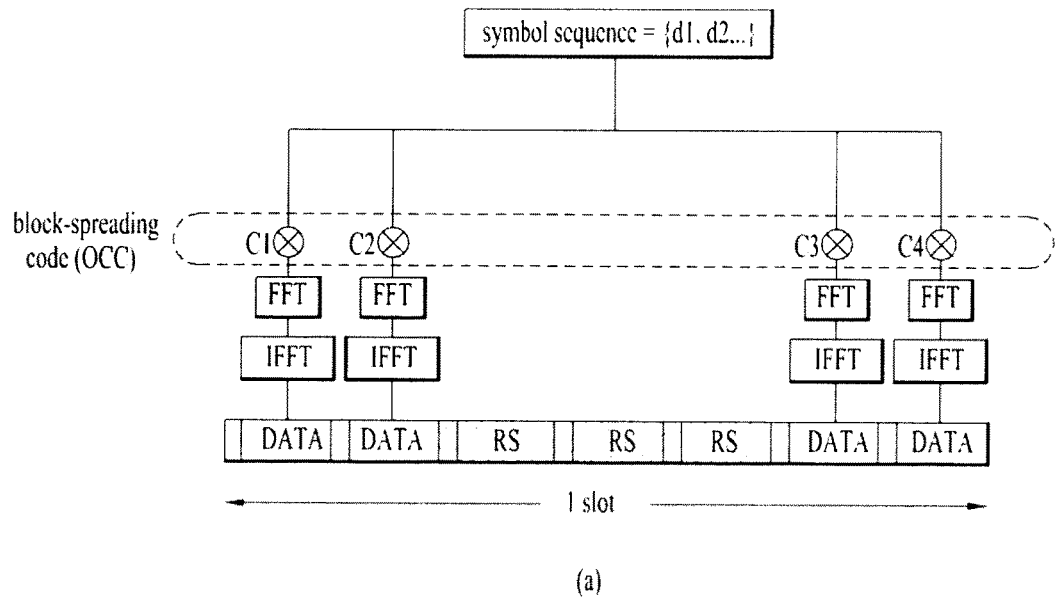
(a)
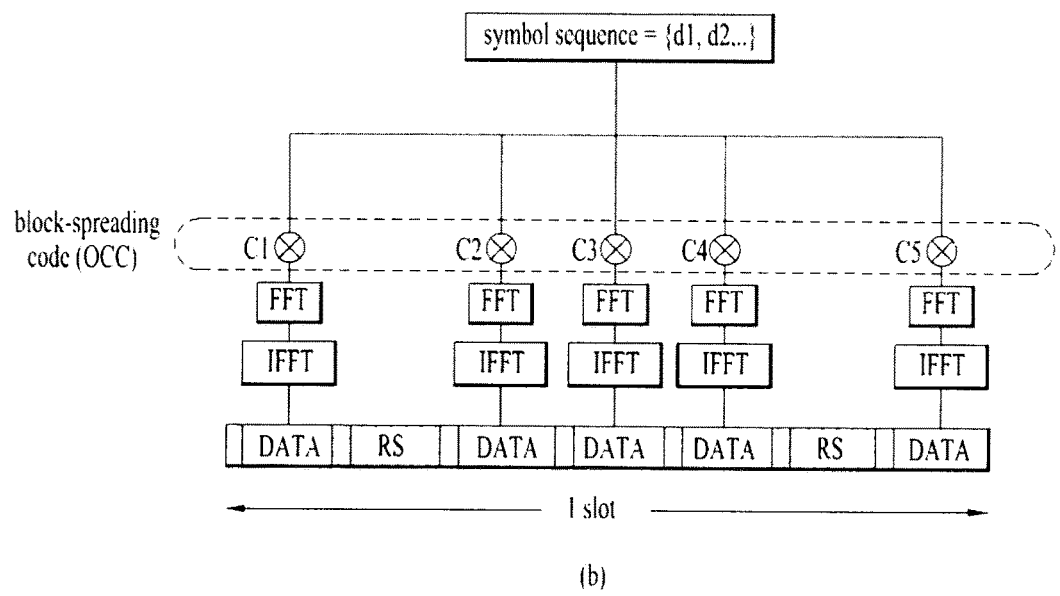
(b)

(a)  (b)

FIG. 14
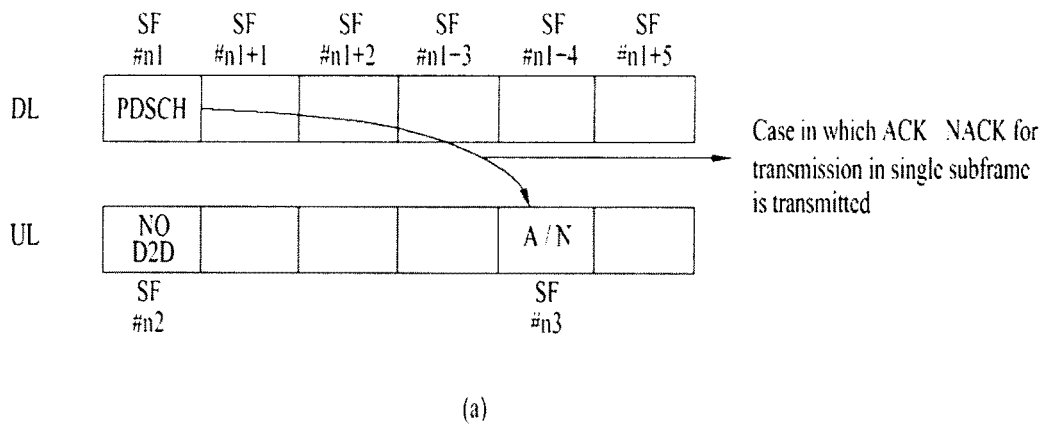
(a)
Case in which ACK/NACK for transmission in single subframe is transmitted
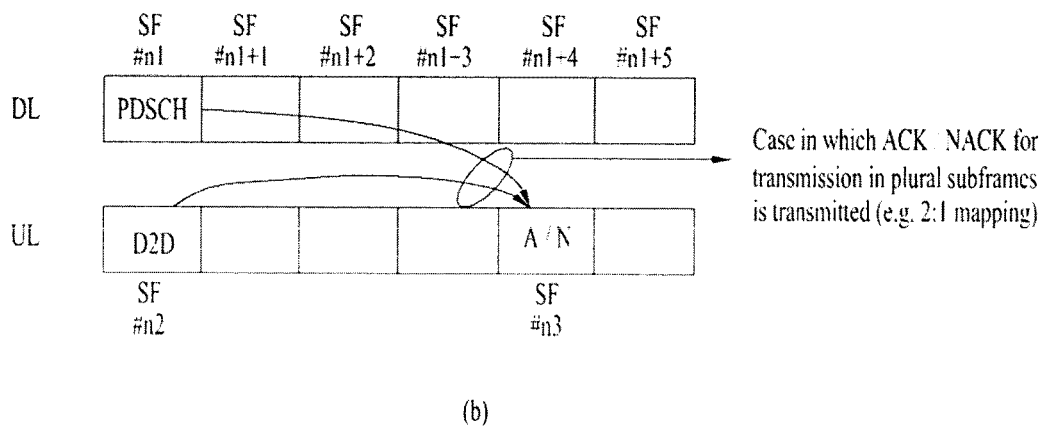
(b)
Case in which ACK/NACK for transmission in plural subframes is transmitted (e.g. 2:1 mapping)
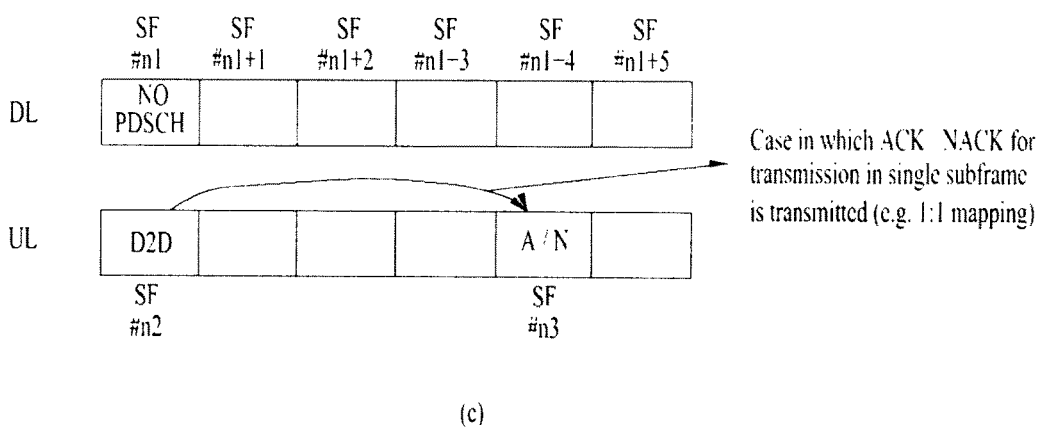
(c)
Case in which ACK/NACK for transmission in single subframe is transmitted (e.g. 1:1 mapping)

METHOD AND DEVICE FOR COMMUNICATING DEVICE-TO-DEVICE

This application is a 35 USC §371 National Stage entry of International Application No. PCT/KR2012/001891 filed on Mar. 15, 2012, and claims priority to U.S. Provisional Application Nos. 61/453,967, filed Mar. 18, 2011; 61/475,642 filed Apr. 14, 2011, and 61/537,039, filed Sep. 20, 2011, all of which are incorporated by reference in their entirety herein.

TECHNICAL FIELD

The present invention relates to a wireless communication system, and more specifically, to a method and device for device-to-device communication.

BACKGROUND ART

Device-to-Device (D2D) communication is a communication scheme for directly transmitting/receiving data between user equipments (UEs) without an evolved NodeB (eNB) by establishing a direct link between UEs. D2D communication may include UE-to-UE and peer-to-peer communication schemes. In addition, D2D communication is applicable to machine-to-machine communication, machine type communication (MTC), etc.

D2D communication is a method considered for reducing the burden of an eNB due to rapidly increasing data traffic. For example, D2D communication can decrease network overload because data is directly exchanged between devices without an eNB, unlike a conventional wireless communication system.

Furthermore, D2D communication can reduce the number of processes of an eNB and power consumption of devices participating in D2D communication, increase data throughput and network capacity, distribute loads, extend cell coverage, etc.

DISCLOSURE

Technical Problem

An object of the present invention devised to solve the problem lies in a method for performing D2D communication efficiently and correctly. Another object of the present invention is to provide a new D2D communication method for allocating resources for D2D communication by a network. Another object of the present invention is to provide a method for efficiently performing D2D communication request, D2D link detection, allocation of resources for D2D communication and D2D communication maintenance.

The technical problems solved by the present invention are not limited to the above technical problems and those skilled in the art may understand other technical problems from the following description.

Technical Solution

The object of the present invention can be achieved by providing a method for a first UE to transmit a signal to a second UE, the method including: requesting that an eNB perform resource allocation for signal transmission to the second UE; receiving scheduling information for signal transmission to the second UE from the eNB; and transmitting a signal to the second UE on the basis of the scheduling information. The scheduling information may include information on an uplink resource for signal transmission from the first UE to the second UE.

In another aspect of the present invention, provided herein is a method for a second UE to receive a signal from a first UE, the method including: receiving scheduling information for signal transmission from the first UE to the second UE from an eNB; and receiving a signal from the first UE on the basis of the scheduling information. The scheduling information may include information on an uplink resource used for the second UE to receive a signal from the first UE.

In another aspect of the present invention, provided herein is a method for an eNB to support signal transmission from a first UE to a second UE, the method including: receiving from the first UE a resource allocation request for signal transmission from the first UE to the second UE; and transmitting to the first UE and the second UE scheduling information for signal transmission from the first UE to the second UE. The scheduling information may include information on an uplink resource used for the first UE to transmit a signal to the second UE.

In another aspect of the present invention, provided herein is a transceiver for transmitting a signal to another device, including: a transmission module for transmitting signals to an eNB and the other device; a reception module for receiving a signal from the eNB; and a processor for controlling the transceiver including the transmission module and the reception module. The processor may be configured to request the eNB to allocate a resource for signal transmission to the other device, to receive scheduling information for signal transmission to the other device from the eNB and to transmit a signal to the other device on the basis of the scheduling information. The scheduling information may include information on an uplink resource used for the transceiver to transmit a signal to the other device.

In another aspect of the present invention, provided herein is a transceiver for receiving a signal from another device, including: a transmission module for transmitting a signal to an eNB; a reception module for receiving signals from the eNB and the other device; and a processor for controlling the transceiver including the transmission module and the reception module. The processor may be configured to receive from the eNB scheduling information for signal transmission from the other device to the transceiver and to receive a signal from the other device on the basis of the scheduling information. The scheduling information may include information on an uplink resource used for the transceiver to receive a signal from the other device.

In another aspect of the present invention, provided herein is an eNB device supporting signal transmission from a first transceiver to a second transceiver, including: a transmission module for transmitting signals to the first and second transceivers; a reception module for receiving signals from the first and second transceivers; and a processor for controlling the eNB device including the transmission module and the reception module. The processor may be configured to receive, from the first transceiver, a resource allocation request for signal transmission from the first transceiver to the second transceiver and to transmit to the first and second transceivers scheduling information for signal transmission from the first transceiver to the second transceiver. The scheduling information may include information on an uplink resource used for the first transceiver to transmit a signal to the second transceiver.

The following may be commonly applied to the above-described embodiments of the present invention.

The first UE may transmit a signal for channel state measurement in the second UE.

One or more of a physical uplink control channel (PUCCH), a physical uplink shared channel (PUSCH), an uplink modulation reference signal (UL DMRS), a sounding reference signal (SRS) and a physical random access channel (PRACH) preamble may be transmitted on the uplink resource from the first UE to the second UE.

One or more of a physical downlink control channel (PDCCH), a physical downlink shared channel (PDSCH), a cell-specific reference signal and a channel state information-reference signal (CSI-RS) may be transmitted on the uplink resource from the first UE to the second UE.

A scheduling request or a PRACH preamble may be transmitted from the first UE to the eNB, and the first UE may receive an uplink grant from the eNB and transmit additional information including one or more of the ID of the first UE, the ID of the second UE and a buffer state report of the first UE to the eNB using the uplink grant.

ACK/NACK information for the signal received from the first UE may be transmitted from the second UE to the eNB.

The ACK/NACK information for the signal received from the first UE may be transmitted to the eNB along with ACK/NACK information for a signal received from the eNB.

ACK/NACK information for a maximum of N signals received by the second UE may be transmitted on a single uplink subframe, and N may be a fixed value in both a case in which the ACK/NACK information for the signal received from the first UE is transmitted in the single uplink subframe and a case in which the ACK/NACK information for the signal received from the first UE is not transmitted in the single uplink subframe.

When the signal from the first UE is received in a subframe n, the ACK/NACK information for the signal received from the first UE may transmitted in a subframe in which ACK/NACK information for downlink data from the eNB is transmitted when the downlink data is received from the eNB in the subframe n, an initial uplink subframe from among subframes after a predetermined process time from the subframe n, or an initial subframe scheduled to transmit uplink data from among subframes after a predetermined process time from the subframe n.

The second UE may receive, from the first UE, a signal for measuring the state of a channel from the first UE and transmit channel state information to the eNB.

When the channel state information is transmitted in a subframe n, a channel state information reference resource may be set to a latest uplink subframe belonging to the same uplink HARQ process as that to which the subframe n belongs from among subframes prior to the subframe n, a latest uplink subframe from among subframes a predetermined process time in advance of the subframe n, a latest uplink subframe from among subframes a predetermined process time in advance of the subframe n and after a subframe in which control information for requesting transmission of the channel state information is received, or a latest subframe scheduled to transmit the signal for measuring the state of the channel from the first UE from among subframes a predetermined process time in advance of the subframe n.

When uplink transmission of the second UE is set in the uplink resource, uplink transmission of the second UE may be dropped.

Above description and the following detailed description of the present invention are exemplary and are for the purpose of additional explanation of the claims.

Advantageous Effects

According to the present invention, it is possible to provide a method of performing D2D communication efficiently and correctly.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas;
FIG. 9 illustrates an ACK/NACK channel structure using block spreading;
FIG. 14 illustrates ACK/NACK information transmission for D2D transmission.

BEST MODE

Figure 1:
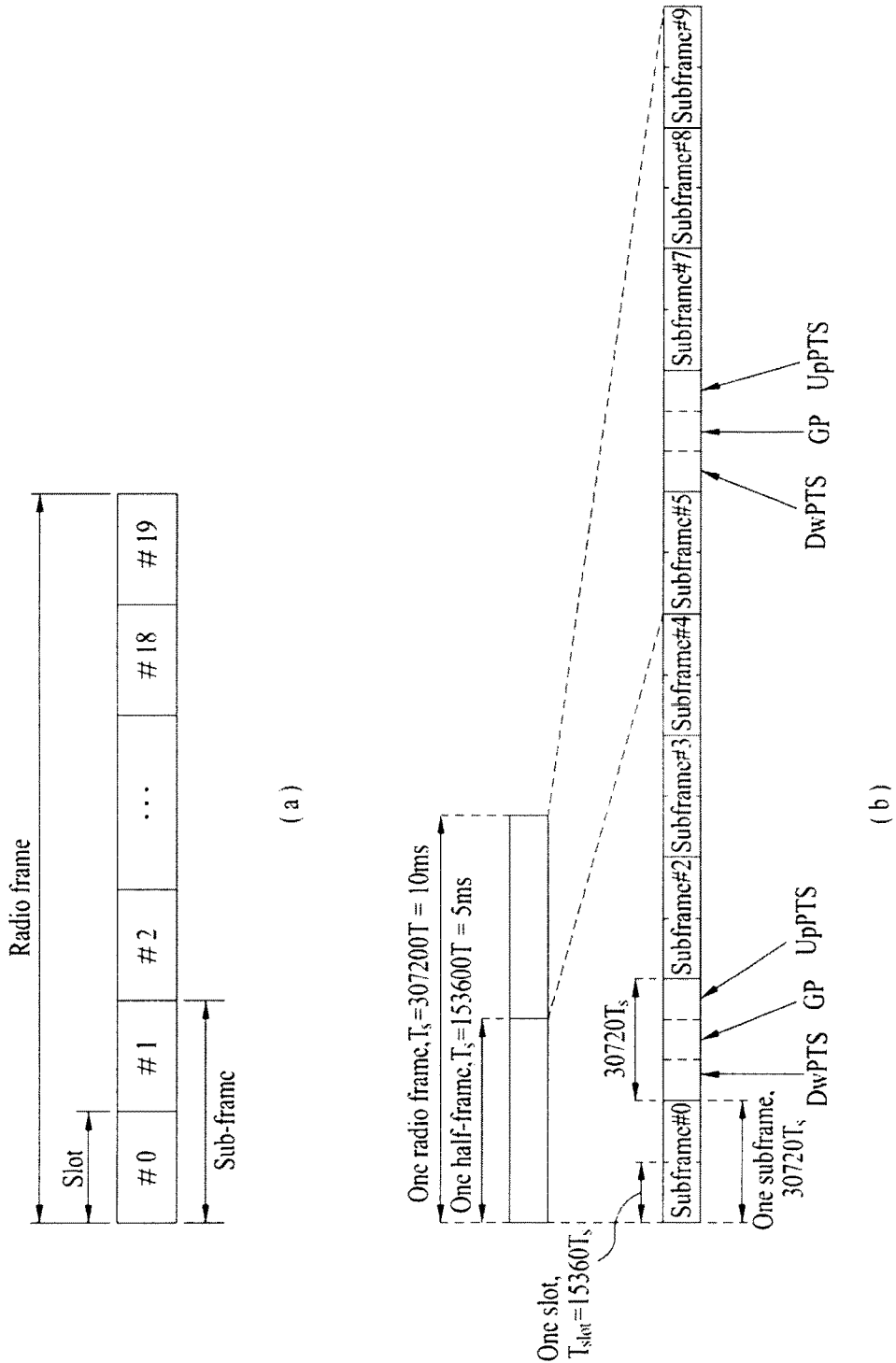
FIG. 1 illustrates a downlink radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advance (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE—Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A downlink radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
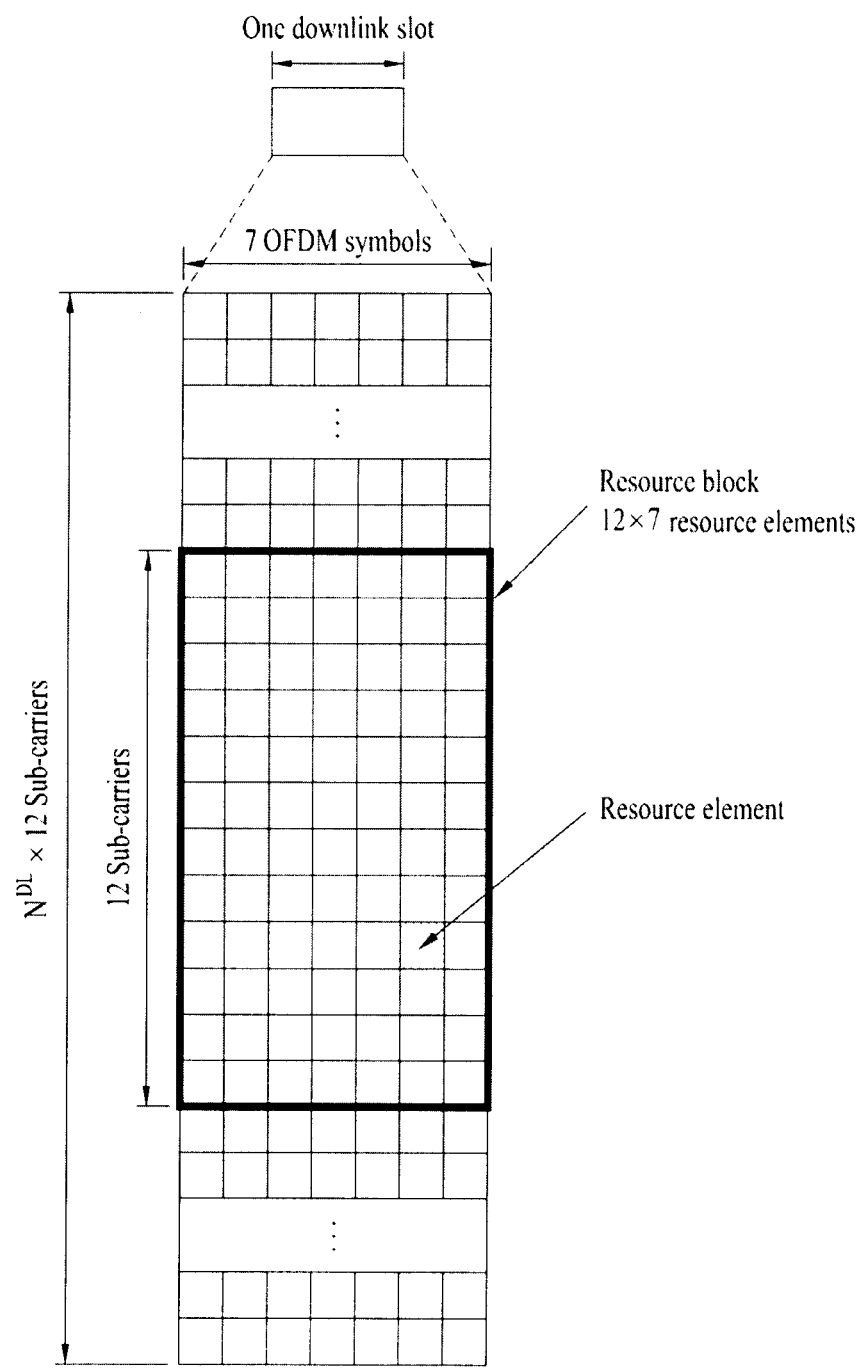
FIG. 2 illustrates a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
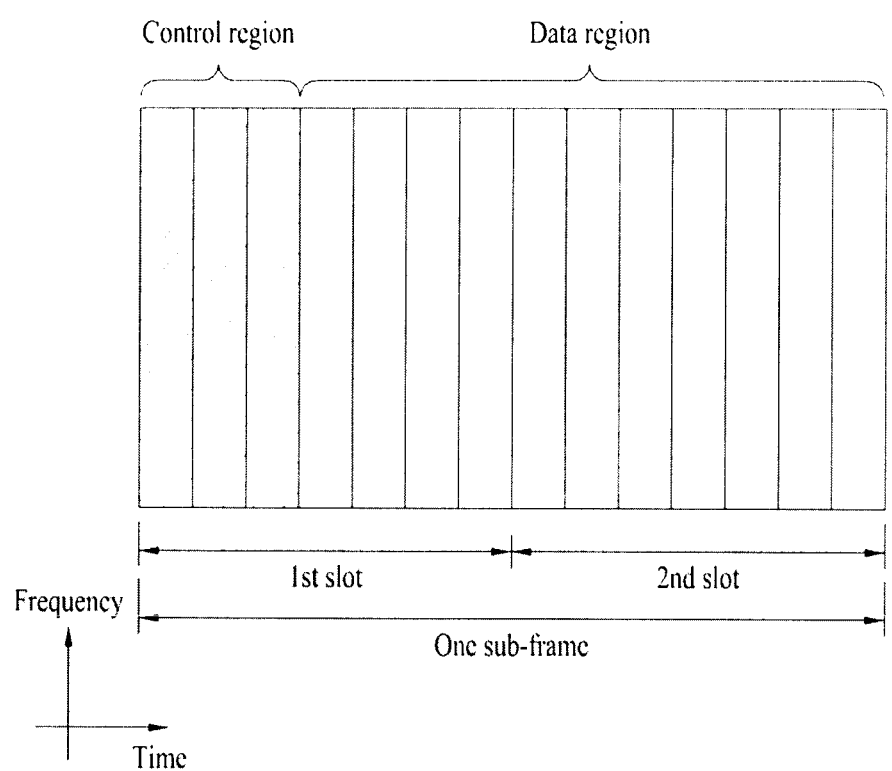
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
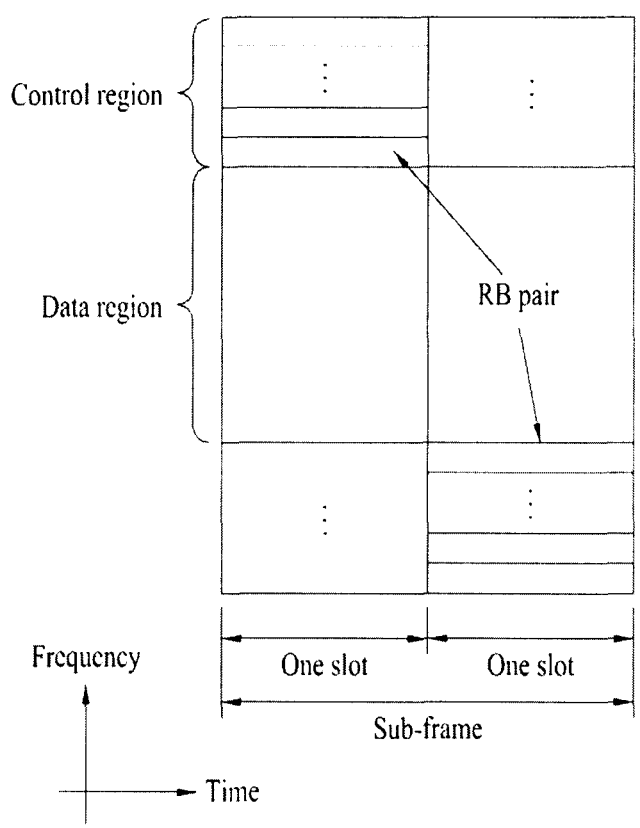
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}] \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [P_{s_1}, P_{s_2}, \ldots, P_{s_{N_T}}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vectors by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \qquad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Downlink Channel Status (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2l or W=W2*W1.

Here, W1 reflects frequency and/or temporal average characteristics of a channel. In other words, W1 can be defined as CSI reflecting characteristics of a long-term channel in the time domain, characteristics of a wideband channel in the frequency domain or characteristics of a long-term and wideband channel. To simply represent these characteristics of W1, W1 is referred to as long term-wideband CSI (or long term-wideband PMI) in this specification.

W2 reflects instantaneous channel characteristics compared to W1. In other words, W2 can be defined as CSI reflecting characteristics of a short-term channel in the time domain, characteristics of a subband channel in the frequency domain or characteristics of a short-term and subband channel. To simply represent these characteristics of W2, W2 is referred to as short term-subband CSI (or short term-subband PMI) in this specification.

To determine a final precoding matrix W from two different pieces of information (e.g. W1 and W2) representing channel states, it is necessary to configure separate codebooks (i.e. a first codebook for W1 and a second codebook for W2) composed of precoding matrices representing the information. A codebook configured in this manner may be called a hierarchical codebook. Determination of a final codebook using the hierarchical codebook is called hierarchical codebook transformation.

A codebook can be transformed using a long-term covariance matrix of a channel, represented by Equation 12, as exemplary hierarchical codebook transformation.

$$W = \text{norm}(W1\,W2) \quad \text{[Equation 12]}$$

In Equation 12, W1 (long term-wideband PMI) denotes an element (i.e. codeword) constituting a codebook (e.g. first codebook) generated to reflect long term-wideband channel information. That is, W1 corresponds to a precoding matrix included in the first codebook that reflects the long term-wideband channel information. W2 (short term-subband PMI) represents a codeword constituting a codebook (e.g. second codebook) generated to reflect short term/subband channel information. That is, W2 corresponds to a precoding matrix included in the second codebook that reflects the short term-subband channel information. W is a codeword of a transformed final codebook and norm(A) denotes a matrix in which the norm of each column of matrix A is normalized to 1.

W1 and W2 may have structures as represented by Equation 13.

$$W1(i) = \begin{bmatrix} X_i & 0 \\ 0 & X_i \end{bmatrix} \quad \text{[Equation 13]}$$

$$W2(j) = \begin{bmatrix} \overbrace{e_M^k \quad e_M^l \quad \cdots \quad e_M^m}^{r\ columns} \\ \alpha_j e_M^k \quad \beta_j e_M^l \quad \gamma_j e_M^m \end{bmatrix} \quad \text{(if rank} = r\text{)}$$

In Equation 13, W1 can be defined as a block diagonal matrix and blocks correspond to the same matrix $X_i$. A block $X_i$ can be defined as a (Nt/2)×M matrix. Here, Nt denotes the number of Tx antennas. $e_M^p$ (p=k, l, ..., m) is an M×1 vector wherein a p-th element of M vector elements represents 1 and other elements represent 0. When W1 is multiplied by $e_M^p$, a p-th column is selected from columns of W1 and thus this vector can be called a selection vector. The number of vectors fed back at a time to represent a long term-wideband channel increases as M increases, to thereby improve feedback accuracy. However, the codebook size of W1 fed back with low frequency decreases and the codebook size of W2 fed back with high frequency increases as M increases, increasing feedback overhead. That is, there is a tradeoff between feedback overhead and feedback accuracy. Accordingly, M can be determined such that feedback overhead is not excessively increased and appropriate feedback accuracy is maintained. As to W2, $\alpha_j$, $\beta_j$ and $\gamma_j$ are predetermined phase values. In Equation 13, $1 \le k,l,m \le M$ and k, l and m are integers.

The codebook structure represented by Equation 13 uses a cross polarized antenna configuration and reflects correlation characteristics of a channel, generated when antenna spacing is narrow (when a distance between neighboring antennas is less than half a signal wavelength). For example, cross polarized antenna configurations may be represented as shown in Table 1.

TABLE 1

| 2Tx cross-polarized antenna configuration | 1  2 |
| --- | --- |
| 4Tx cross-polarized antenna configuration | 1  3  2  4 |
| 8Tx cross-polarized antenna configuration | 1  5  2  6  3  7  4  8 |

In Table 1, an 8Tx cross polarized antenna configuration is composed of two antenna groups having orthogonal polarizations. Antennas belonging to antenna group 1 (antennas 1, 2, 3 and 4) may have the same polarization (e.g. vertical polarization) and antennas belonging to antenna group 2 (antennas 5, 6 7 and 8) may have the same polarization (e.g. horizontal polarization). The two antenna groups are co-located. For example, antennas 1 and 5 can be co-located, antennas 2 and 6 can be co-located, antennas 3 and 7 can be co-located and antenna 2 and 8 can be co-located. In other words, antennas in an antenna group have the same polarization as in a uniform linear array (ULA) and a correlation between antennas in an antenna group has a linear phase increment characteristic. Furthermore, a correlation between antenna groups has a phase rotation characteristic.

Since a codebook is composed of values obtained by quantizing a channel, it is necessary to design the codebook by reflecting actual channel characteristics therein. To describe reflection of actual channel characteristics in codewords of a codebook designed as represented by Equation 13, a rank-1 codebook is exemplified. Equation 14 represents determination of a final codeword W by multiplying codeword W1 by codeword W2 in the case of rank 1.

$$W1(i) * W2(j) = \begin{bmatrix} X_i(k) \\ \alpha_j X_i(k) \end{bmatrix} \quad \text{[Equation 14]}$$

In Equation 14, the final codeword is represented by a vector of Nt×1 and is composed of an upper vector $X_i(k)$ and a lower vector $\alpha_j X_i(k)$ which respectively represent correlations between horizontal antenna groups and vertical antenna groups of cross polarized antennas. $X_i(k)$ is preferably represented as a vector (e.g. DFT matrix) having linear phase increment in which correlation between antennas in each antenna group is reflected.

When the above-described codebook is used, higher channel feedback accuracy can be achieved compared to a case in which a single codebook is used. Single-cell MU-MIMO can be performed using high accuracy channel feedback and thus high accuracy channel feedback is necessary for CoMP operation. For example, plural eNBs cooperatively transmit the same data to a specific UE in CoMP JT operation, and thus this system can be theoretically regarded as a MIMO system in which plural antennas are geographically distributed. That is, even when MU-MIMO operation is performed in CoMP JT, high channel information accuracy is necessary to avoid interference between co-scheduled UEs. In addition, CoMP CB also requires accurate channel information in order to avoid interference of a neighboring cell, applied to a serving cell.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal. When multiple antennas are used to transmit and receive data, a correct signal can be received only when channel state between each Tx antenna and each Rx antenna is detected. Accordingly, a reference signal is required for each Tx antenna.

In legacy wireless communication systems (e.g. 3GPP LTE release-8 or release-9), a downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal.

To provide higher spectral efficiency than 3GPP LTE (e.g. LTE release-8 or release-9), a system (e.g. LTE-A (Advanced)) having an extended antenna configuration may be designed. The extended antenna configuration may be an 8Tx antenna configuration. The system having the extended antenna configuration needs to support UEs operating in a conventional antenna configuration. That is, the system needs to support backward compatibility. Accordingly, it is necessary to support a reference signal pattern according to the conventional antenna configuration and to design a new reference signal pattern for an additional antenna configuration.

Since LTE defines the downlink reference signal only for a maximum of 4 antenna ports, if an eNB has up to 8 downlink Tx antennas in LTE-A, RSs for up to 8 Tx antennas need to be additionally defined. Both an RS for channel measurement and an RS for data demodulation need to be considered as the RSs for up to 8 Tx antennas.

When the RSs for up to 8 Tx antennas are added to a time-frequency region in which a CRS defined in LTE is transmitted per subframe through a whole band, RS overhead excessively increases during RS transmission. Therefore, it is necessary to consider reduction of RS overhead when the RSs for up to 8 Tx antennas are newly designed.

RSs newly introduced to LTE-A may be categorized into a channel state information RS (CSI-RS) for channel measurement for calculation/selection of a RI, PMI, CQI, etc. and a demodulation RS (DM RS) for demodulation of data transmitted through a maximum of 8 Tx antennas.

The CSI-RS is designed mainly for channel measurement, unlike the CRS of LTE, which is used for channel measurement, handover measurement and data demodulation. The CSI-RS may also be used for handover measurement. Since the CSI-RS is mainly used to obtain channel state information, the CSI-RS need not be transmitted per subframe unlike the CRS of LTE. Accordingly, the CSI-RS can be designed such that it is intermittently (e.g. periodically) transmitted in the time domain to reduce CSI-RS overhead.

When data is transmitted on a downlink subframe, a DM RS is transmitted to a UE scheduled to receive the data. A DM RS for a specific UE can be designed such that it is transmitted only in a resource region for which the specific UE is scheduled, that is, a time-frequency region in which data for the specific UE is transmitted.

Reference signals transmitted on uplink include a UL DMRS and a sounding reference signal (SRS). The UL DMRS is a reference signal transmitted for PUSCH demodulation and may be transmitted on the fourth SC-FDMA symbol from among seven SC-FDMA symbols of each slot in the normal CP case. The SRS is described in detail below.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe).

The SRS may be used for measuring downlink channel quality on the assumption of the reciprocity of a radio channel between the downlink and the uplink. This assumption is valid especially in a time division duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other one configuration (a $16^{th}$ configuration) represented by the parameter is perfect switch-off of SRS transmission in a cell, suitable for a cell serving high-speed UEs, for example.

An SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Physical Uplink Control Channel (PUCCH)

Uplink control information (UCI) transmitted on a PUCCH may include a scheduling request (SR), HARQ ACK/NACK information, and downlink channel measurement information.

The HARQ ACK/NACK information may be generated according to whether a downlink data packet on a PDSCH is successfully decoded. In conventional wireless communication systems, 1 bit is transmitted as ACK/NACK information for downlink single codeword transmission and 2 bits are transmitted as the ACK/NACK information for downlink 2-codeword transmission.

The channel measurement information represents feedback information about a multiple input multiple output (MIMO) scheme and may include a channel quality indicator (CQI), a precoding matrix index (PMI), and a rank indicator (RI) which may be collectively referred to as a CQI. 20 bits per subframe may be used to transmit the CQI.

A PUCCH can be modulated using binary phase shift keying (BPSK) and quadrature phase shift keying (QPSK). Control information of a plurality of UEs can be transmitted through a PUCCH. When code division multiplexing (CDM) is performed in order to distinguish signals of the UEs from one another, a length-12 constant amplitude zero autocorrelation (CAZAC) sequence is used. The CAZAC sequence is suitable to increase coverage by reducing a peak-to-average power ratio (PAPR) of a UE or cubic metric (CM) because it maintain a specific amplitude in the time domain and the frequency domain. ACK/NACK information with respect to downlink data transmitted through a PUCCH is covered using an orthogonal sequence or an orthogonal cover (OC).

Control information signals transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may vary according to channel delay spread. Various types of sequences may be used as the base sequence and the aforementioned CAZAC sequence is an example of the various sequences.

The amount of control information that can be transmitted by a UE through a subframe can be determined according to the number of SC-FDMA symbols (i.e. SC-FDMA symbols other than SC-FDMA symbols used for reference signal (RS) transmission for detection of coherent of a PUCCH) which can be used for control information transmission.

In 3GPP LTE, a PUCCH is defined in seven different formats according to transmitted control information, modulation scheme and the quantity of control information and attributes of transmitted uplink control information (UCI) according to each PUCCH format can be summarized as shown in Table 2.

TABLE 2

| PUCCH format | Modulation scheme | Number of bits per subframe | Usage | etc. |
| --- | --- | --- | --- | --- |
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is solely transmitted, an unmodulated waveform is applied, which will be described in detail below.

PUCCH format 1a or 1b is used for HARQ ACK/NACK transmission. When HARQ ACK/NACK is solely transmitted in a subframe, PUCCH format 1a or 1b may be used. Furthermore, HARQ ACK/NACK and SR may be transmitted in the same subframe using PUCCH format 1a or 1b.

PUCCH format 2 is used for CQI transmission whereas PUCCH format 2a or 2b is used for transmission of CQI and HARQ ACK/NACK. In the extended CP case, PUCCH format 2 may be used for transmission of CQI and HARQ ACK/NACK.

Figure 6:
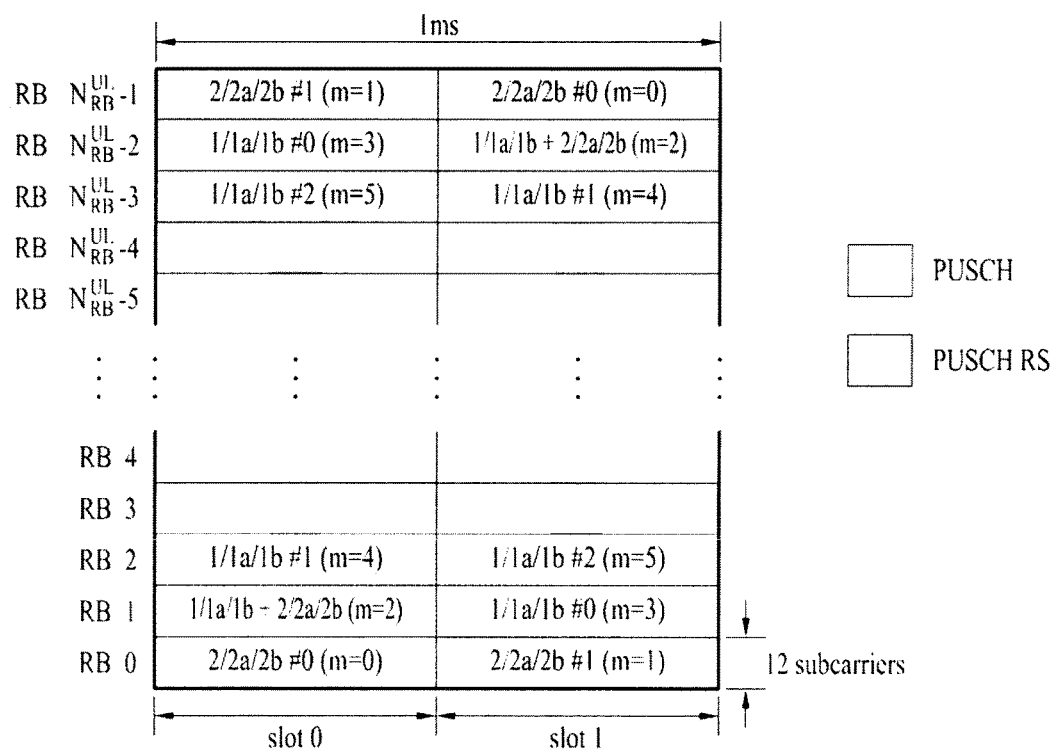
FIG. 6 illustrates mapping of PUCCH formats to PUCCH regions in uplink physical resource blocks.

FIG. 6 illustrates mapping of PUCCH formats to PUCCH regions in uplink physical resource blocks. In FIG. 6, $N_{RB}^{UL}$ denotes the number of resource blocks on uplink and $0, 1, \ldots, N_{RB}^{UL}-1$ denote physical resource block numbers. PUCCHs are mapped to both edges of uplink frequency blocks basically. As shown in FIG. 6, PUCCH formats 2/2a/2b are mapped to PUCCH regions indicated by m=0,1, which represents that PUCCH formats 2/2a/2b are mapped to resource blocks located at band-edges. PUCCH formats 2/2a/2b and PUCCH formats 1/1a/1b may be mixed and mapped to PUCCH regions indicated by m=2. PUCCH formats 1/1a/1b may be mapped to PUCCH regions indicated by m=3,4,5. The number $N_{RB}^{(2)}$ of PUCCH RBs can be used by PUCCH formats 2/2a/2b may be signaled to UEs in a cell through broadcasting signaling.

PUCCH Resource

A BS allocates a PUCCH resource for UCI transmission to a UE using an explicit or implicit method through higher layer signaling.

In the case of ACK/NACK, a plurality of PUCCH resource candidates may be set for a UE by a higher layer and a PUCCH resource to be used by the UE from among the PUCCH resource candidates may be implicitly determined. For example, the UE can receive a PDSCH from the BS and transmit ACK/NACK for a corresponding to data unit through a PUCCH resource implicitly indicated by a PDCCH resource carrying scheduling information on the PDSCH.

In LTE, a PUCCH resource that will carry ACK/NACK information is not previously allocated to a UE. Rather, plural PUCCH resources are used separately at each time instant plural UEs within a cell. Specifically, a PUCCH resource that a UE will use to transmit ACK/NACK information is implicitly indicated by a PDCCH carrying scheduling information for a PDSCH that delivers downlink data. An entire area carrying PDCCHs in a DL subframe include a plurality of Control Channel Elements (CCEs) and a PDCCH transmitted to a UE includes one or more CCEs. A CCE includes a plurality of (e.g. 9) Resource Element Groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH. That is, each PUCCH resource index can correspond to a PUCCH resource for ACK/NACK. For example, if a PDCCH including CCEs #4, #5 and #6 delivers scheduling information on a PDSCH to a UE, the UE transmits ACK/NACK information to a BS on a PUCCH, for example, PUCCH #4 derived or calculated using the lowest CCE index of the PDCCH, CCE index 4. Up to M' CCEs may be present in a downlink subframe and up to M PUCCHs may be present in an uplink subframe. Although M may be equal to M', M may be different from M' and CCEs may be mapped to PUCCHs in an overlapping manner.

For instance, a PUCCH resource index may be calculated by the following equation.

$$n^{(1)}_{PUCCH} = n_{CCE} + N^{(1)}_{PUCCH} \qquad \text{[Equation 15]}$$

Here, $n^{(1)}_{PUCCH}$ denotes the index of a PUCCH resource for transmitting ACK/NACK information, $N^{(1)}_{PUCCH}$ denotes a signaling value received from a higher layer, and $n_{CCE}$ denotes the lowest of CCE indexes used for transmission of a PDCCH.

PUCCH Channel Structure

PUCCH formats 1a and 1b are described.

In the PUCCH format 1a/1b, a symbol modulated using BPSK or QPSK is multiplied by a CAZAC sequence of length 12. For example, when a modulated symbol d(0) is multiplied by a length-N CAZAC sequence r(n) (n=0, 1, 2, ..., N−1), y(0), y(1), y(2), y(N−1) are obtained. Symbols y(0), y(1), y(2), ..., y(N−1) may be called a block of symbols. Upon completion of the CAZAC sequence multiplication, the resultant symbol is blockwise-spread using an orthogonal sequence.

A Hadamard sequence of length 4 is applied to general ACK/NACK information, and a DFT (Discrete Fourier Transform) sequence of length 3 is applied to shortened ACK/NACK information and a reference signal. A Hadamard sequence of length 2 may be applied to the reference signal in the case of the extended CP.

Figure 7:
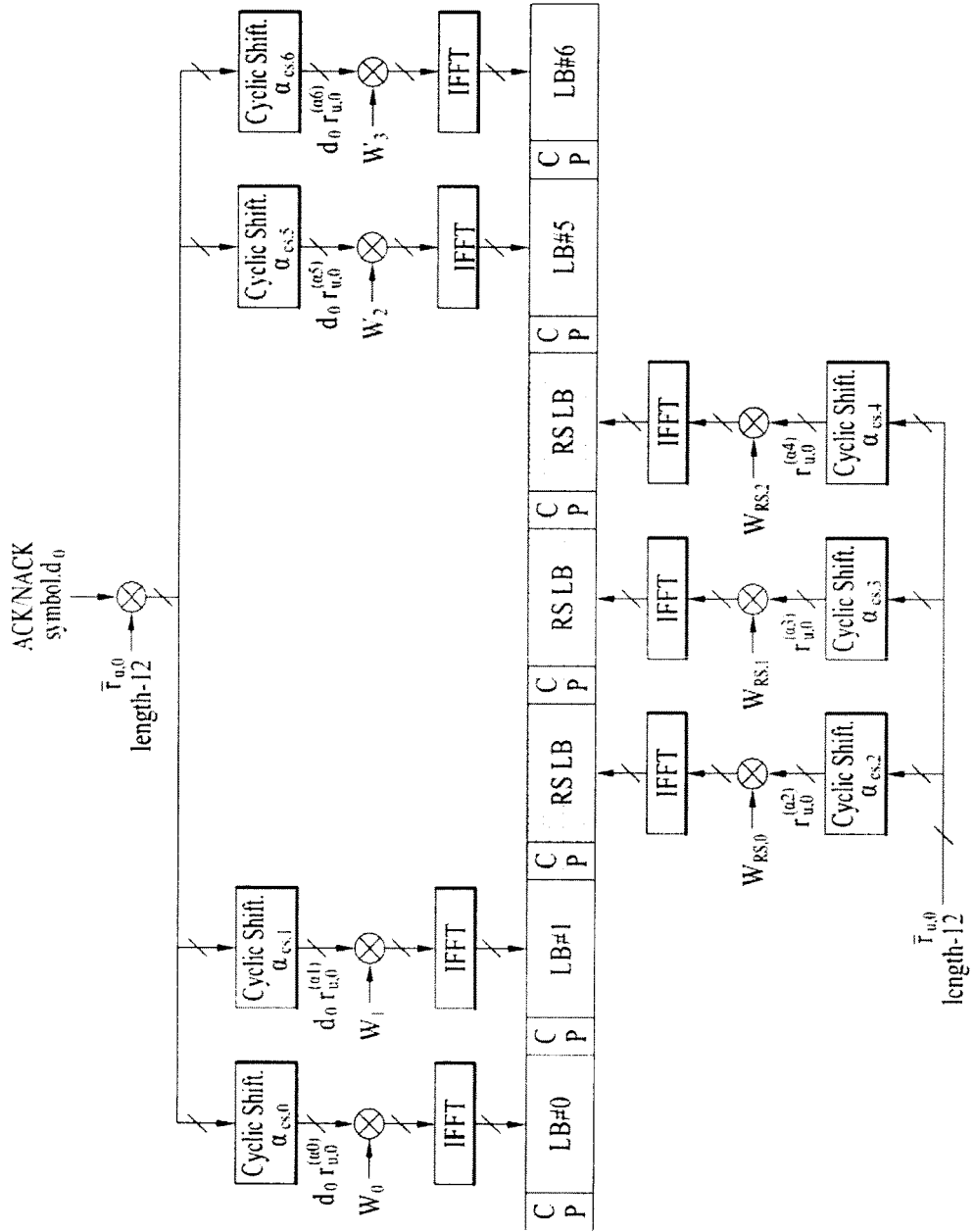
FIG. 7 illustrates an ACK/NACK channel structure in a normal CP case.

FIG. 7 illustrates an ACK/NACK channel structure in normal CP case. FIG. 7 shows an exemplary PUCCH channel structure for HARQ ACK/NACK transmission without CQI. Three contiguous SC-FDMA symbols in the middle of seven SC-FDMA symbols carry an RS and the remaining four SC-FDMA symbols carry an ACK/NACK signal. In the case of the extended CP, two contiguous symbols in the middle of SC-FDMA symbols may carry an RS. The number and positions of symbols used for the RS may depend on a control channel and the number and positions of symbols used for the ACK/NACK signal may be changed according to the number and positions of symbols used for the RS.

1-bit ACK/NACK information and 2-bit ACK/NACK information (unscrambled) may be represented a HARQ ACK/NACK modulation symbol using BPSK and QPSK, respectively. ACK information may be encoded as '1' and NACK information may be encoded as '0'.

When a control signal is transmitted in an allocated band, 2-dimensional spreading is applied to improve multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one type of CAZAC sequence, can be used as the frequency domain sequence. For example, different cyclic shifts (CSs) can be applied to a ZC sequence as a basic sequence to multiple different UEs or different control channels. The number of CS resources supported by SC-FDMA symbols for PUCCH RBs for HARQ ACK/NACK transmission is set by a cell-specific higher-layer signaling parameter $\Delta_{shift}^{PUCCH}$ and $\Delta_{shift}^{PUCCH} \in \{1, 2, 3\}$ represents 12, 6 or 4 shifts.

The frequency-domain-spread ACK/NACK signal is spread in the time domain using an orthogonal spreading code. A Walsh-Hadamard sequence or a DFT sequence can be used as the orthogonal spreading code. For example, an ACK/NACK signal can be spread using a length-4 orthogonal sequence w0, w1, w2, w3. An RS is spread using a length-2 or length-2 orthogonal sequence. This is called orthogonal covering.

A plurality of UEs can be multiplexed through code division multiplexing (CDM) using CS resources in the frequency domain and OC resources in the time domain as described above. That is, ACK/NACK information and RSs of a large number of UEs can be multiplexed on the same PUCCH RB.

For time domain spreading CDM, the number of spreading codes supported for ACK/NACK information is limited by the number of RS symbols. That is, since the number of SC-FDMA symbols for RS transmission is smaller than the number of SC-FDMA symbols for ACK/NACK transmission, multiplexing capacity of an RS is less than multiplexing capacity of ACK/NACK information. For example, while ACK/NACK information can be transmitted through four symbols in the normal CP case, three orthogonal spreading codes are used for ACK/NACK information because the number of RS transmission symbols is limited to three and thus only three orthogonal spreading codes can be used for the RS.

Examples of an orthogonal sequence used to spread ACK/NACK information are shown in Tables 3 and 4. Table 3 shows a sequence for a length-4 symbol and Table 4 shows a sequence for a length-3 symbol. The sequence for the length-4 symbol is used in PUCCH format 1/1a/1b of a normal subframe configuration. Considering a case in which an SRS is transmitted on the last symbol of the second slot in a subframe configuration, the sequence for the length-4 symbol can be applied to the first slot and shortened PUCCH format 1/1a/1b of the sequence for the length-3 symbol can be applied to the second slot.

TABLE 3

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 4

| Sequence index | [w(0), w(1), w(2)] |
|---|---|
| 1 | [1 1 1] |
| 1 | [1 $e^{j2\pi/3}$ $e^{j4\pi/3}$] |
| 2 | [1 $e^{j4\pi/3}$ $e^{j2\pi/3}$] |

An exemplary orthogonal sequence used for RS spreading of an ACK/NACK channel is as shown in Table 5.

TABLE 5

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

When three symbols are used for RS transmission and four symbols are used for ACK/NACK information transmission in a slot of a normal CP subframe, if six CSs in the frequency domain and three OC resources in the time domain can be used, for example, HARQ ACK/NACK signals from a total of 18 different UEs can be multiplexed in a PUCCH RB. When two symbols are used for RS transmission and four symbols are used for ACK/NACK information transmission in a slot of an extended CP subframe, if six CSs in the frequency domain and two OC resources in the time domain can be used, for example, HARQ ACK/NACK signals from a total of 12 different UEs can be multiplexed in a PUCCH RB.

PUCCH format 1 is described. A UE requests scheduling through a scheduling request (SR). An SR channel reuses an ACK/NACK channel structure in the PUCCH format 1a/1b and is configured in an on-off keying manner on the basis of ACK/NACK channel design. A reference signal is not transmitted on the SR channel. Accordingly, a length-7 sequence is used in the normal CP case and a length-6 sequence is used in the extended CP case. Different CSs or orthogonal covers may be allocated to an SR and ACK/NACK. That is, for positive SR transmission, a UE transmits HARQ ACK/NACK through a resource allocated for the SR. For negative SR transmission, the UE transmits HARQ ACK/NACK through a resource allocated for ACK/NACK.

The PUCCH format 2/2a/2b is will now be described. The PUCCH format 2/2a/2b is used to transmit channel measurement feedback (CQI, PMI and RI).

A channel feedback (referred to as CQI hereinafter) reporting period and a frequency unit (or frequency resolution) corresponding to a measurement target can be controlled by an eNB. Periodic and aperiodic CQI reports can be supported in the time domain. PUCCH format 2 can be used for the periodic report only and a PUSCH can be used for the aperiodic report. In the case of aperiodic report, the eNB can instruct a UE to transmit an individual CQI report on a resource scheduled to transmit uplink data.

Figure 8:
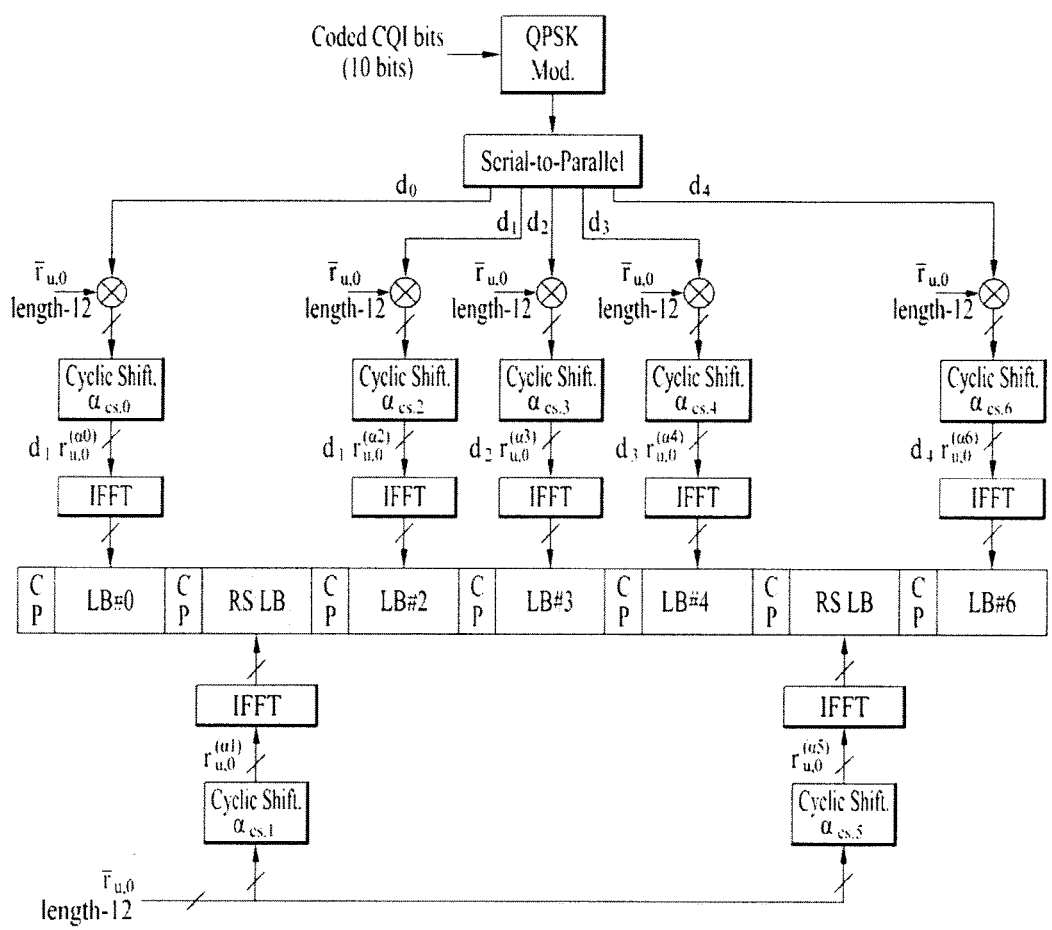
FIG. 8 illustrates a CQI channel structure in the normal CP case.

FIG. 8 illustrates a CQI channel structure in the case of normal CP. SC-FDMA symbols #1 to #5 (second and sixth symbols) from among SC-FDMA symbols #0 to #6 of a slot can be used for DMRS transmission and the remaining SC-FDMA symbols can be used for CQI transmission. In the case of extended CP, an SC-FDMA symbol (SC-FDMA symbol #3) is used for DMRS transmission.

The PUCCH format 2/2a/2b supports modulation by a CAZAC sequence and a symbol modulated according to QPSK is multiplied by a CAZAC sequence of length 12. A CS of the sequence is changed between symbols and between slots. Orthogonal covering is used for the DMRS.

Two SC-FDMA symbols having a distance therebetween, which corresponds to the interval of three SC-FDMA symbols, from among seven SC-FDMA symbols included in a slot carry a DMRS and the remaining five SC-FDMA symbols carry CQI. Two RSs are used in a slot in order to support a fast UE. Each UE is identified using a CS sequence. CQI symbols are modulated into SC-FDMA symbols and transmitted. The SC-FDMA symbols are composed of a sequence. That is, a UE modulates CQI into each sequence and transmits the sequence.

The number of symbols that can be transmitted in a TTI is 10 and modulation of CQI is performed using QPSK. When QPSK mapping is used for SC-FDMA symbols, an SC-FDMA symbol can carry 2-bit CQI and thus a slot can carry 10-bit CQI. Accordingly, a maximum of 20-bit CQI can be transmitted in a subframe. To spread CQI in the frequency domain, a frequency domain spreading code is used.

A length-12 CAZAC sequence (e.g. ZC sequence) can be used as the frequency domain spreading code. Control channels can be discriminated from each other using CAZAC sequences having different CS values. The frequency-domain-spread CQI is subjected to IFFT.

12 different UEs can be orthogonally multiplexed in the same PUCCH RB using 12 CSs at an equal interval. In the case of normal CP, while a DMRS sequence on SC-FDMA symbols #1 and #5 (SC-FDMA symbols #3 in the case of extended CP) is similar to a CQI signal sequence in the frequency domain, the DMRS sequence is not modulated. A UE can be semi-statically configured by higher layer signaling to periodically report different CQI, PMI and RI types on a PUCCH resource indicated by a PUCCh resource index $n_{PUCCH}^{(2)}$. Here, the PUCCH resource index $n_{PUCCH}^{(2)}$ is information indicating a PUCCH region and a CS value used for PUCCH format 2/2a/2b transmission.

An enhanced PUCCH (e-PUCCH) format will now be described. The e-PUCCH format may correspond to the PUCCH format 3 of LTE-A. Block spreading can be applied to ACK/NACK transmission using PUCCH format 3.

Figure 13:
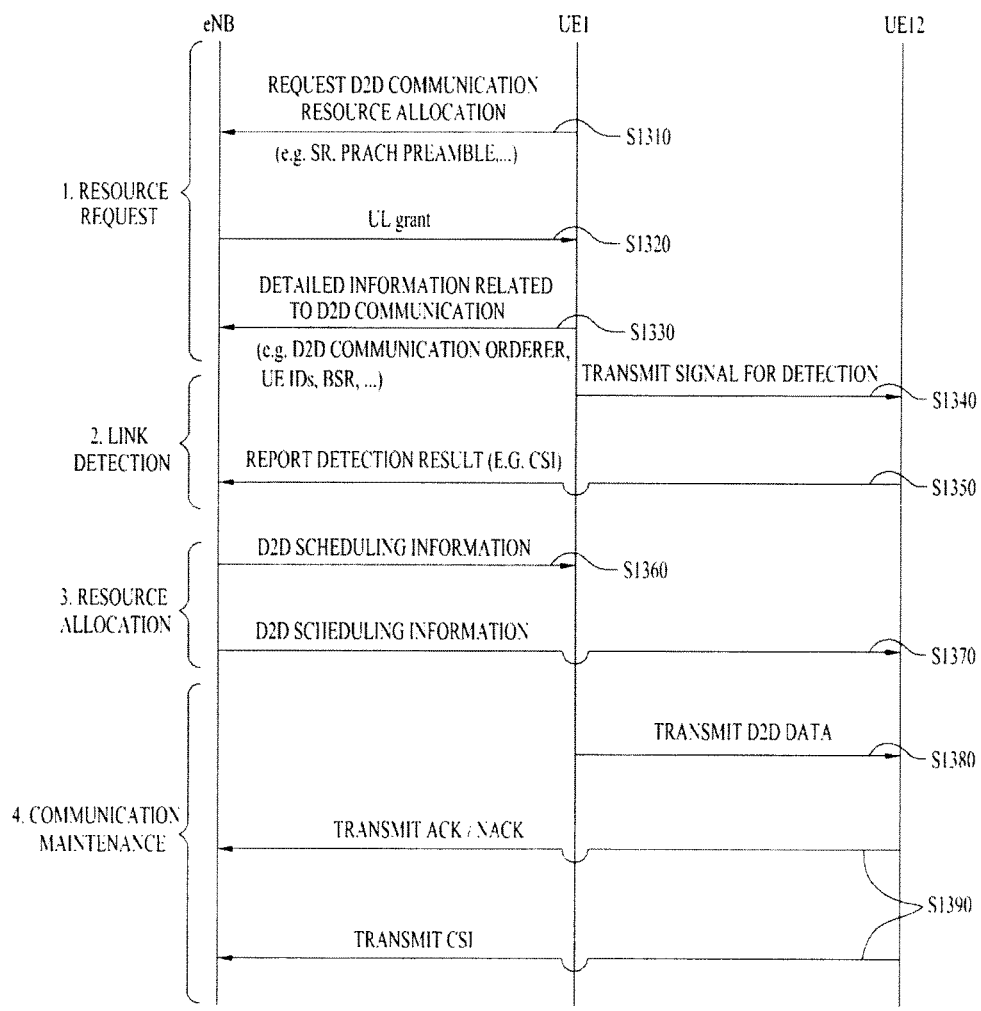
FIG. 13 is a flowchart illustrating an exemplary D2D communication method according to the present invention.

Block spreading is a method of modulating a control signal using SC-FDMA, distinguished from the PUCCH format 1 series or 2 series. As shown in FIG. 13, a symbol sequence can be spread in the time domain using an orthogonal cover code (OCC) and transmitted. Control signals of plural UEs can be multiplexed in the same RB using the OCC. A symbol sequence is transmitted in the time domain and control signals of multiple UEs are multiplexed using CSs of a CAZAC sequence in the above-described PUCCH format 2, whereas a symbol sequence is transmitted in the frequency domain and control signals of multiple UEs are multiplexed through time domain spreading using an OCC in the block spreading based PUCCH format (e.g. PUCCH format 3).

FIG. 9(a) illustrates an example of generating and transmitting four SC-FDMA symbols (i.e. data part) using a length-4 (or spreading factor (SF)=4) OCC in a symbol sequence during one slot. In this case, three RS symbols (i.e. RS part) can be used in one slot.

FIG. 9(b) illustrates an example of generating and transmitting five SC-FDMA symbols (i.e. data part) using a length-5 (or SF=5) OCC in a symbol sequence during one slot. In this case, two RS symbols can be used per slot.

In the examples of FIG. 9, the RS symbols can be generated from a CAZAC sequence to which a specific CS value is applied, and a predetermined OCC can be applied to (or multiplied by) a plurality of RS symbols and transmitted. If 12 modulated symbols are used per OFDM symbol (or SC-FDMA symbol) and each modulated symbol is generated according to QPSK in the example of FIG. 13, a maximum of 12×2=24 bits can be transmitted in a slot. Accordingly, a total of 48 bits can be transmitted in two slots. When a block spreading based PUCCH channel structure is used as described above, it is possible to transmit an increased quantity of control information compared to the PUCCH format 1 series and 2 series.

Carrier Aggregation

The concept of a cell, which is introduced to manage radio resources in LTE-A is described prior to carrier aggregation (CA). A cell may be regarded as a combination of downlink resources and uplink resources. The uplink resources are not essential elements, and thus the cell may be composed of the downlink resources only or both the downlink resources and uplink resources. This is definition in LTE-A release 10, and the cell may be composed of the uplink resources only. The downlink resources may be referred to as downlink component carriers and the uplink resources may be referred to as uplink component carriers. A DL CC and a UL CC may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCell. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCell in addition to a PCell initially configured during connection establishment after initial security activation is initiated.

Figure 10:
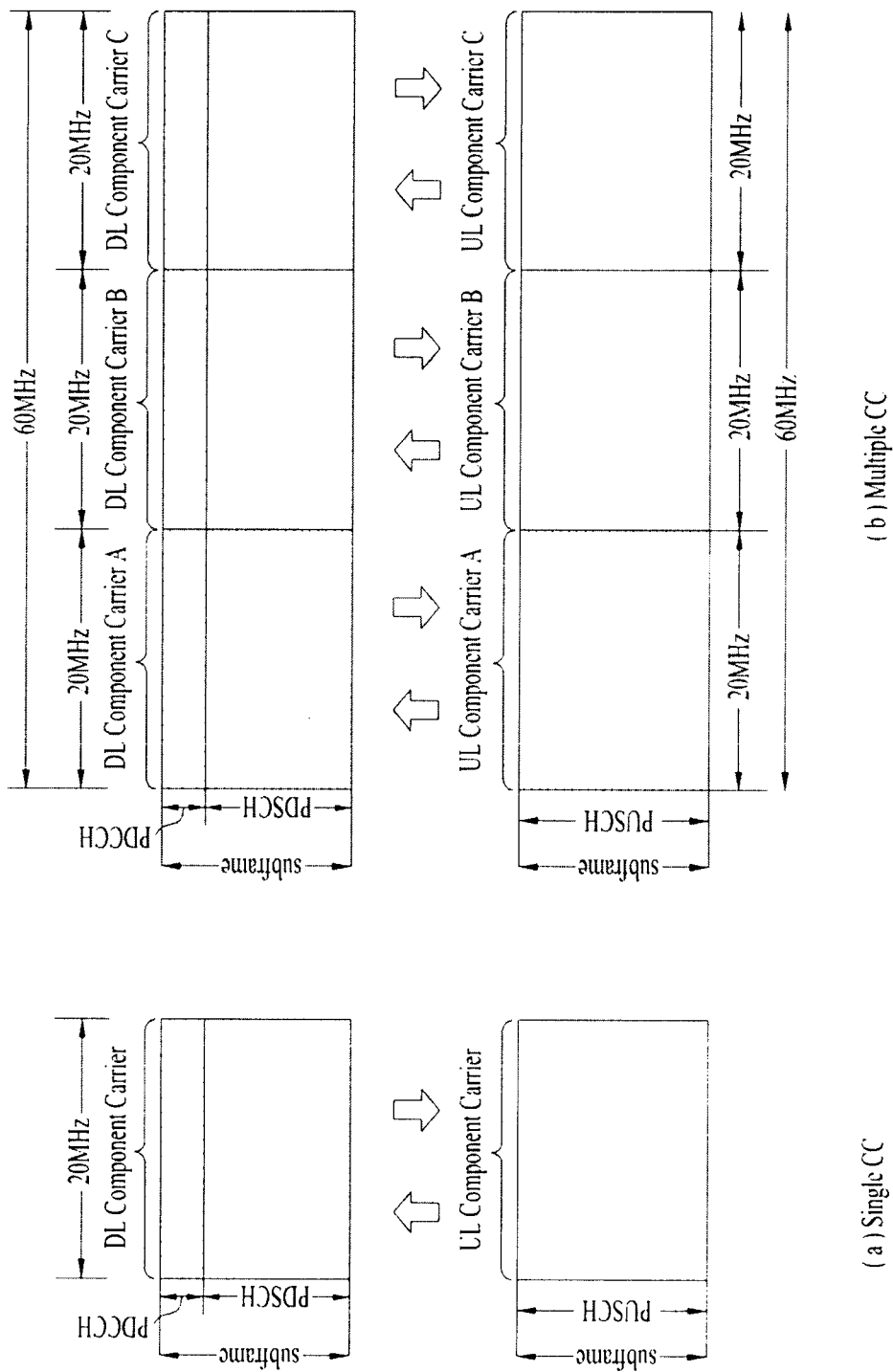
FIG. 10 illustrates carrier aggregation.

CA is described with reference to FIG. 10. CA is a technology introduced to use a wider band to meet demands for a high transmission rate. CA can be defined as aggregation of two or more component carriers (CCs) having different carrier frequencies. FIG. 10($a$) shows a subframe when a conventional LTE system uses a single CC and FIG. 8($b$) shows a subframe when CA is used. In FIG. 10($b$), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 11:
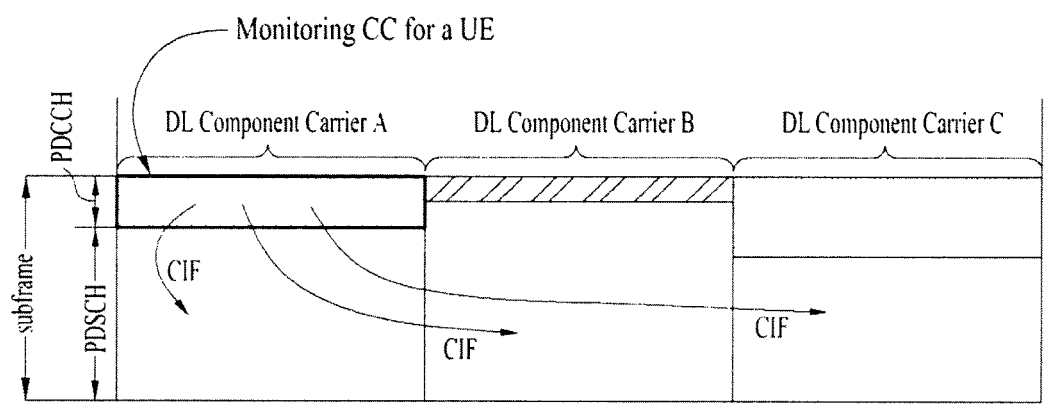
FIG. 11 illustrates cross-carrier scheduling.

FIG. 11 is a diagram illustrating cross-carrier scheduling. Cross carrier scheduling is scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first. The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 9, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling.

When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed 3-bit length, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 9, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

ACK/NACK Transmission

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above-mentioned ACK/NACK bundling or multiplexing when the number of ACK/NACK bits to be transmitted is greater than the number of ACK/NACK bits that can be supported by ACK/NACK bundling or multiplexing.

An ACK/NACK multiplexing scheme will now be described.

In case of ACK/NACK multiplexing, the contents of an ACK/NACK response to a plurality of data units can be identified by a combination of an ACK/NACK unit actually used for ACK/NACK transmission and symbols modulated according to QPSK. For example, if an ACK/NACK unit carries 2-bit information and receives a maximum of two data units and a HARQ ACK/NACK response to each of the received data units is represented by an ACK/NACK bit, a transmitter that has transmitted data can identify ACK/NACK results as shown in Table 6.

TABLE 6

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 6, HARQ-ACK(i) (i=0, 1) represents an ACK/NACK result with respect to data unit i. Since a maximum of two data units (data unit 0 and data unit 1) are received as described above, an ACK/NACK result with respect to data unit 0 is represented as HARQ-ACK(0) and an ACK/NACK result with respect to data unit 1 is represented as HARQ-ACK(1) in Table 6. DTX (Discontinuous Transmission) indicates that the data unit corresponding to HARQ-ACK(i) is not transmitted or a receiver cannot detect the data unit corresponding to HARQ-ACK(i). In Table 6, $n_{PUCCH,X}^{(1)}$ denotes an ACK/NACK unit used for actual ACK/NACK transmission. When a maximum of two ACK/NACK units are present, the ACK/NACK units can be represented as $n_{PUCCH,0}^{(1)}$ and $n_{PUCCH,1}^{(1)}$. In addition, b(0) and b(1) denote two bits transmitted by selected ACK/NACK units. Modulated symbols transmitted through ACK/NACK units are determined based on b(0) and b(1).

For example, when the receiver successfully receives and decodes two data units (in the case of ACK and ACK of Table 6), the receiver transmits two bits (1, 1) using the ACK/NACK unit $n_{PUCCH,1}^{(1)}$. If the receiver receives two data units, fails to decode (or detect) the first data unit (i.e. data unit 0 corresponding to HARQ-ACK(0)) and successfully decodes the second data unit (i.e. data unit 1 corresponding to HARQ-ACK(1)) (in the case of NACK/DTX and ACK of Table 6), the receiver transmits two bits (0, 0) using the ACK/NACK unit $n_{PUCCH,1}^{(1)}$.

As described above, it is possible to transmit ACK/NACK information about a plurality of data units using a single ACK/NACK unit by linking or mapping a combination of a selected ACK/NACK unit and bits of the selected ACK/NACK unit (i.e. a combination of $n_{PUCCH,0}^{(1)}$ or $n_{PUCCH,1}^{(1)}$ and b(0) and b(1) in FIG. 6) to the contents of ACK/NACK. ACK/NACK multiplexing for two or more data units can be easily implemented by extending the principle of the above-described ACK/NACK multiplexing.

In the above-described ACK/NACK multiplexing scheme, NACK and DTX may not be discriminated from each other when one or more ACKs are present for each data unit (that is, NACK and DTX can be coupled as NACK/DTX as shown in Table 6). This is because all ACK/NACK states (i.e. ACK/NACK hypotheses) that may be generated when NACK and DTX are discriminated from each other cannot be represented by only combinations of ACK/NACK units and symbols modulated by BPSK. When ACK is not present for any data unit (that is, only NACK or DTX is present for all data units), a single definite NACK case that represents a definite NACK (NACK discriminated from DTX) from among HARQ-ACK(i) can be defined. In this case, a PUCCH resource corresponding to a data unit with respect to a definite NACK may be reserved to transmit a plurality of ACK/NACK signals.

D2D Communication

A description will be given of a D2D communication scheme when D2D communication is introduced to a wireless communication system (e.g. 3GPP LTE system or 3GPP LTE-A system).

Figure 12:
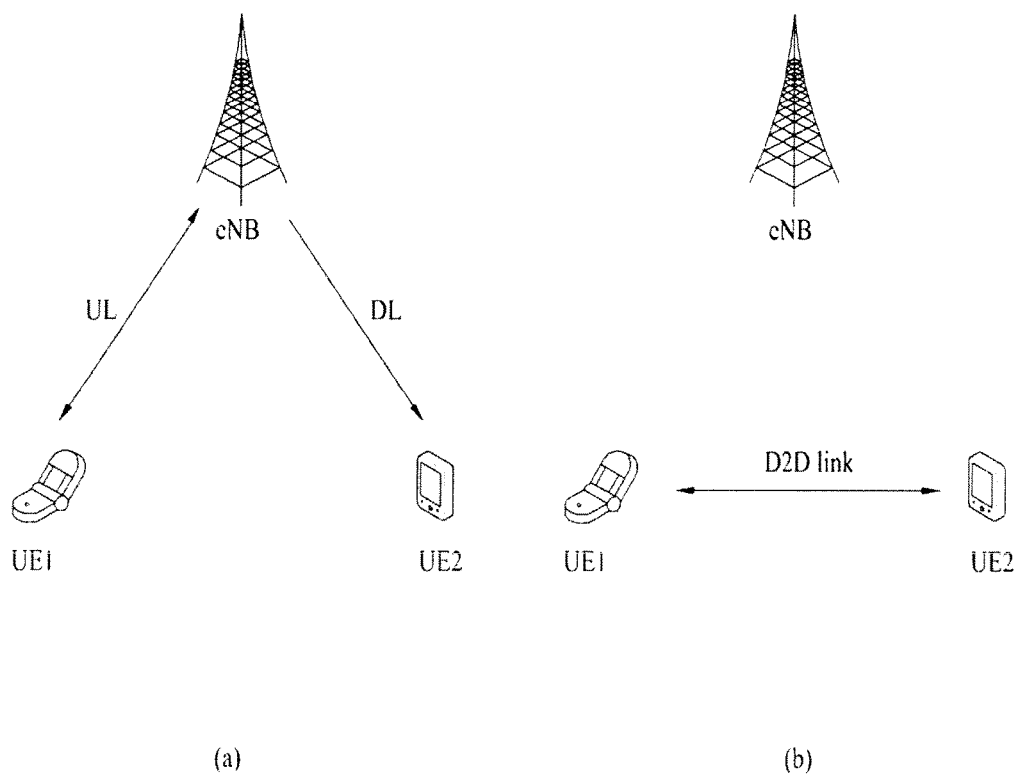
FIG. 12 illustrates the concept of D2D communication.

FIG. 12 illustrates the concept of D2D communication. FIG. 12(a) shows a conventional BS based communication scheme through which UE1 transmits data to a BS on uplink and the BS transmits the data from UE1 to UE2 on downlink.

FIG. 12(b) illustrates a UE-to-UE communication scheme as an exemplary D2D communication scheme, through which data can be exchanged between UEs without a BS. A link directly established between devices may be called a D2D link. D2D communication reduces latency and requires a smaller quantity of radio resources, compared to conventional BS based communication.

While D2D communication supports communication between devices (or between UEs) without a BS, D2D communication must not cause interference or disturbance in a legacy wireless communication network because D2D communication is performed by reusing resources of the legacy wireless communication network (e.g. 3GPP LTE or 3GPP LTE-A). That is, resources for D2D communication need to be allocated by a BS although data is transmitted/received between devices without the BS. Accordingly, the present invention proposes a method of allocating resources for D2D communication by a BS. For example, uplink resources can be reused as resources for D2D communication.

A description will be given of a D2D communication procedure on the assumption that UE1 and UE2 directly communicate with each other without an eNB. While direct communication between UEs is exemplified as the D2D communication scheme proposed by the present invention for clarity of description, the scope of the present invention is not limited thereto. That is, the technical spirit of the present invention is applicable to D2D communication in a broad sense. For example, the D2D communication scheme of the present invention can be applied to operation of an eNB to transmit a signal to a UE using resources set through uplink by a cell to which the eNB belongs or a neighboring cell. Specifically, it is possible to equally apply the principle of the D2D communication scheme proposed by the present invention to communication between an eNB and a UE by considering the eNB as a UE that transmits a signal through an uplink resource.

FIG. 13 is a flowchart illustrating an exemplary D2D communication method according to the present invention. All or some steps of the D2D communication method illustrated in FIG. 13 may implement embodiments of the present invention. That is, essential components of the present invention need not include the entire procedure illustrated in FIG. 13 and only part of the procedure may be regarded as essential elements for accomplishing the object of the present invention. Embodiments of the present invention will be described according to process flow for clarity.

The following embodiment is described on the assumption that UE1 transmits data and UE2 receives data in D2D communication in FIG. 13.

1. D2D Communication Resource Request

A UE participating in D2D communication may request an eNB to provide a resource for D2D communication through steps S1310, S1320 and S1330.

In step S1310, UE2 that wants to transmit data to UE2 in a D2D communication manner requests the eNB to allocate a resource for D2D communication to UE1. The eNB may transmit an uplink grant to UE1 in response to the request of UE1 in step S1320. In step S1330, UE1 may transmit information related to D2D communication to the eNB using the uplink grant received in step S1320. In normal wireless communication systems, an uplink grant may refer to scheduling information for uplink transmission from a UE to an eNB.

The uplink grant in step S1320 is scheduling information used for a UE to transmit information related to D2D communication to the eNB. Specifically, the resource allocation request in step S1310 corresponds to request control information used for UE1 to request the eNB to provide uplink transmission opportunity to UE1 when UE1 is not allocated a resource for uplink transmission by the eNB. Since U1 that is not allocated the resource to uplink transmission cannot transmit a large quantity of information to the eNB, UE1 may transmit D2D communication related information to the eNB through steps S1310, S1320 and S1330 and request the eNB to allocate a resource for D2D thereto.

More specifically, control information for a D2D communication resource allocation request transmitted from UE1 in step S1310 may be a scheduling request (SR) or physical random access channel (PRACH) preamble. The SR is control information for requesting allocation of a resource available for uplink transmission. The PRACH preamble may be transmitted to an eNB at an arbitrary time in a random access procedure while a UE is not allocated a resource for uplink transmission. The eNB provides a UL grant to the UE in response to the PRACH preamble. Accordingly, in the present embodiment of the invention, UE1 may transmit the SR or PRACH preamble to the eNB in order to obtain uplink transmission opportunity to transmit detailed information for D2D communication. In addition to the SR and PRACH preamble, a predetermined indicator or control information indicating that UE1 requests D2D communication resource allocation may be transmitted in step S1310.

Information transmitted from UE1 to the eNB in step S1330 may include an indicator indicating a request for D2D communication, IDs of devices (e.g., UE1 and UE2) participating in D2D communication, a buffer status report (BSR) on the quantity of data traffic to be transmitted through D2D communication, which is accumulated in a buffer of UE1, etc. Upon reception of this information, the eNB may specify devices paired for D2D communication and determine the quantity of resources necessary for D2D communication.

If UE1 has obtained uplink transmission opportunity from the eNB prior to step S1310, steps S1310 and S1320 may be omitted and detailed information about D2D communication may be transmitted along with the control information for requesting D2D communication resource allocation in step S1330.

2. D2D Link Detection

Parameters (e.g. transmit power, modulation and coding scheme (MCS), etc.) of D2D communication for a link between UE1 and UE2 can be determined by the eNB. Accordingly, communication performed by devices in a legacy wireless communication system is not affected by D2D communication.

To enable the eNB to recognize a D2D communication link state, a device participating in D2D communication may report a channel state of a D2D link to the eNB. To achieve this, the eNB may instruct UE1 to transmit a predetermined signal detectable by UE2 and instruct UE2 to report the strength or quality of the signal received from UE1 to the eNB. Accordingly, UE1 can transmit a signal for D2D link detection to UE2 (S1340) and UE2 can report a D2D link detection result (e.g. an SINR or MCS level) to the eNB (S1350), as shown in FIG. 13.

Instructions of the eNB to perform steps S1340 and S1350 may be transmitted to UE1 and UE2 through explicit signaling (not shown) or in an implicit manner. Otherwise, steps S1340 and S1350 may be performed according to a rule predetermined for D2D link detection signal transmission.

Specifically, the signal transmitted by UE1 in step S1340 may be a periodic or aperiodic SRS transmitted on an uplink resource. In the case of SRS, the eNB can control UE1 to transmit an SRS sequence set by the eNB at a timing determined by the eNB through a resource determined by the eNB by transmitting an appropriate SRS configuration to UE1.

In addition, the eNB can enable UE2 to easily detect the SRS transmitted from UE1 by signaling the SRS configuration to UE2 through higher layer signaling (e.g. RRC signaling). That is, UE2 can attempt to detect the signal (e.g. a specific sequence) from UE1 on the uplink resource corresponding to the SRS configuration for UE1, signaled by the eNB.

Furthermore, the predetermined signal transmitted by UE1 in step S1340 may be a PRACH preamble for random access, for example. The PRACH preamble occupies a narrower bandwidth than the SRS, and thus UE2 can easily detect the signal from UE1 using a smaller quantity of frequency resource.

The eNB can enable UE2 to easily detect the PRACH preamble transmitted from UE1 by signaling information about the PRACH preamble to UE2 through higher layer signaling (e.g. RRC signaling).

The PRACH preamble transmitted from UE1 in step S1340 may be used by UEs that attempt initial access. Resources other than the PRACH preamble may be used. For example, the eNB can instruct UE1 to use a PRACH resource reserved for handover as a D2D link detection signal.

The eNB may instruct UE1 to periodically transmit a specific PRACH preamble in order to prepare for a case in which UE2 cannot successfully detect the signal from UE1.

In addition, the signal (e.g. SRS or PRACH preamble) transmitted by UE1 in step S1340 may be UE1-specifically-randomized. For example, the sequence of the signal transmitted by UE1 can be randomized based on the ID of UE1. In this case, the eNB may signal the ID of UE1 to UE2 such that UE2 can detect the signal from UE1 more easily.

UE2 can report the result of detection of the signal from UE1 to the eNB in step S1350. The eNB can recognize channel characteristics of the D2D link between UE1 and UE2 based on the report from UE2 and acquire synchronization of the link between UE1 and UE2.

3. D2D Communication Resource Allocation

The eNB can allocate resources for D2D communication to devices participating in D2D communication. For example, the eNB can transmit scheduling information for D2D communication to UE1 and UE2, as shown in steps S1360 and S1370 of FIG. 13. Steps S1360 and S1370 may be performed simultaneously or at different times. The D2D communication scheduling information may be determined on the basis of the D2D communication related information (information on devices participating in D2D communication, information on a link to be used for D2D communication, etc.) acquired by the eNB through steps S1330 and/or S1350. If some of the devices participating in D2D communication are served by a neighboring cell, the D2D communication scheduling information may be determined in consideration of scheduling information with respect to the neighboring cell (i.e. according to inter-cell cooperation) and the neighboring cell may provide the scheduling information to the corresponding devices.

The D2D communication scheduling information received by UE1 in step S1360 may be regarded as a UL grant from the viewpoint of UE1 corresponding to a device transmitting data in D2D communication. That is, operation of UE1 to perform uplink transmission through an uplink resource designated by the D2D communication scheduling information from the eNB can be considered similar to operation of a UE to perform uplink transmission according to a UL grant from an eNB in conventional wireless communication systems. Accordingly, the conventional uplink transmission operation according to a UL grant can be reused for UE1 corresponding to a device transmitting data in D2D communication.

The D2D communication scheduling information received by UE2 in step S1370 needs to be interpreted as information for instructing reception operation to be performed on an uplink resource from the viewpoint of UE2 corresponding to a device receiving data in D2D communication. While only uplink transmission or downlink reception operation is defined for UEs in conventional wireless communication systems, uplink reception operation is defined for UEs in D2D communication according to the present invention.

For example, the eNB can represent whether a UL grant indicates transmission operation or reception operation of a UE using a specific field of the UL grant. To achieve this, only one bit is needed and thus a bit reserved in a specific field of a conventional UL grant can be used. Otherwise, a new field indicating transmission or reception operation using a UL grant may be defined.

Alternatively, devices participating in D2D communication may have additional IDs solely for D2D communication in addition to IDs used for communication with the eNB and a UL grant transmitted (e.g., masked with a corresponding RNTI) for the IDs for D2D communication may be construed as a signal indicating uplink reception operation. For example, UE1 may have ID_UE1_cell for communication with the eNB and ID_UE1_D2D for D2D communication and UE2 may have ID_UE2_cell for communication with the eNB and ID_UE2_D2D for D2D communication. The eNB may transmit a UL grant for ID_UE1_cell (S1360) to UE1 that transmits data in D2D communication because the eNB needs to instruct UE1 to perform operation similar to normal operation according to a UL grant and transmit a UL grant for ID_UE2_D2D to UE2 that receives data in D2D communication (S1370).

Alternatively, downlink assignment information may be transmitted to UE2 (device receiving data in D2D communication) in step S1370. In conventional wireless communication systems, DL assignment information may be scheduling information for downlink transmission from an eNB to a UE. The DL assignment information used in step S1370 may be new DL assignment information for instructing UE2 to perform reception using an uplink resource instead of a downlink resource. The new DL assignment information may include a specific field indicating whether the DL assignment information instructs UE2 to perform uplink reception operation or downlink reception operation, for example. Here, the specific field may use a bit reserved in a specific field of the conventional DL assignment information or may be defined as a new field. Alternatively, a device participating in D2D communication may have an additional ID solely for D2D communication in addition to ID used for communication with the eNB and DL assignment information transmitted (e.g., masked with a corresponding RNTI) for the ID for D2D communication may be construed as a signal indicating uplink reception operation. For example, the eNB can transmit DL assignment information for ID_UE2_cell to UE2 that receives data in D2D communication.

As described above, the eNB schedules uplink resources for D2D communication in the D2D communication scheme proposed by the present invention, and thus it can be assumed that D2D communication and normal uplink transmission/reception do not collide. However, when the eNB instructs a specific UE to perform reception operation (i.e. D2D data reception operation) through an uplink resource at a specific time, uplink transmission may be reserved for the UE at the specific time. In this case, the reserved uplink transmission can be cancelled. For example, it is possible to provide higher priority to D2D data reception than uplink transmission for which transmission time is pre-designated by higher layer signaling, such as periodic CSI reporting or periodic SRS transmission. Furthermore, in the case of uplink transmission operation voluntarily performed by a UE, such as scheduling request or random access attempt, the uplink transmission operation may be prevented from being performed when the UE receives a signal from another UE. That is, when uplink transmission and D2D data reception (i.e. reception operation through an uplink resource) collide, uplink transmission can be dropped.

4. D2D Communication Maintenance

A process for sustaining D2D communication includes an operation of performing retransmission or new D2D data transmission using acknowledgement information about data transmitted through a D2D link, an operation of determining an appropriate transmit power, MCS level, etc. for the D2D link from feedback for channel quality of the D2D link, etc. For this process, a device (UE2 in FIG. 13) that receives D2D data needs to feed back ACK/NACK information and/or CSI.

As shown in step S1390 of FIG. 13, UE2 may transmit ACK/NACK information about D2D transmission and/or CSI on the D2D link to the eNB instead of to UE1. The ACK/NACK information and/or CSI are transmitted to the eNB because it is preferable that the eNB considers feedback information for sustaining D2D communication since D2D communication scheduling is performed by the eNB although transmission and reception of D2D data are carried out between devices. A description will be given of a method for transmitting ACK/NACK information and CSI with respect to D2D communication.

4-1. Transmission of ACK/NACK with Respect to D2D Communication

In FIG. 13, UE1 may transmit data to UE2 on the D2D link on the basis of the scheduling information (S1360) from the eNB and UE2 may receive the data from UE1 on the D2D link on the basis of the scheduling information (S1370) from the eNB (S1380). UE2 may attempt to decode the signal received from UE1 and signal the decoding result (e.g. whether decoding has been successfully performed or not) to the eNB (S1390).

Since UE2 transmits ACK/NACK information to the eNB instead of UE1, parameters configured to transmit ACK/NACK for a normal downlink signal from the eNB can be reused as parameters (ACK/NACK transmit power, scrambling sequence, etc.) for transmitting ACK/NACK for a signal received through the D2D link and these parameters may be different from parameters for data transmission through the D2D link.

For example, transmit power for signal transmission on the D2D link can be controlled according to pathloss between devices or fixed to a specific level in consideration of the fact that the channel state of the D2D link does not abruptly vary with time since D2D communication is performed between adjacent devices in general. Since ACK/NACK information about D2D transmission from UE1 to UE2 needs to be received by the eNB instead of UE1, transmit power needs to be determined based on pathloss between the eNB and UE2. For example, UE2 can determine transmit power of ACK/NACK information about D2D communication according to a transmit power control (TPC) command which is signaled to UE2 by the eNB for normal uplink control information transmission rather than D2D communication.

In addition, it is necessary to determine an ACK/NACK resource to enable UE2 to transmit the ACK/NACK information about D2D communication on uplink. The ACK/NACK resource may be a resource configured for UE2 through higher layer signaling (e.g. RRC signaling) or an ACK/NACK resource corresponding to a CCE index of a PDCCH decoded by UE2. Here, the PDCCH may be a channel on which the eNB transmits DCI related to normal uplink/downlink transmission and reception with respect to UE2 or a channel on which the eNB transmits scheduling information (e.g. scheduling information in step S1370) for D2D communication to UE2.

While ACK/NACK information about a D2D signal received by UE2 may be transmitted alone to the eNB, the ACK/NACK information may be transmitted through an uplink subframe along with ACK/NACK information about a downlink signal (e.g. downlink data transmitted on a PDSCH) received by UE2 from the eNB. To simultaneously transmit a plurality of ACKs/NACKs, ACK/NACK bundling, channel selection, joint encoding, etc. may be used. For example, it can be assumed that UE receives a PDSCH from the eNB in subframe n1 and receives D2D data from UE1 in subframe n2. In addition, it can be assumed that two ACK/NACK signals (i.e. ACK/NACK information about the PDSCH received from the eNB and ACK/NACK information about the D2D data received from UE1) are transmitted in subframe n3. In this case, a result of a logical AND operation performed on the two ACK/NACK signals can be transmitted as final ACK/NACK information when ACK/NACK bundling is employed. Otherwise, when channel selection is applied, states of the two ACK/NACK signals can be represented by previously determining a PUCCH resource index corresponding to the signal in subframe n1, a PUCCH resource index corresponding to the signal in subframe n2 and ACK/NACK information state, selecting one of PUCCH resources and transmitting the selected PUCCH resource as ACK/NACK information. When joint coding is used, a result obtained by encoding the two ACK/NACK signals together can be transmitted using a resource determined in a predetermined format (e.g. PUCCH format 3).

When UE2 can transmit ACK/NACK for the PDSCH transmitted from the eNB and ACK/NACK for the D2D data transmitted from UE1, as described above, the number of ACK/NACK signals that need to be processed may be changed according to whether a subframe through which D2D transmission is performed (or a subframe through which D2D transmission may be performed) is present or not even if the number of PDSCHs transmitted from the eNB is fixed. Accordingly, the number of ACK/NACK signals on which an ACK/NACK logical AND operation is performed, a rule of mapping ACK/NACK transmission resources and ACK/NACK information states and/or a coding rate used for joint encoding (or the number of joint-encoded ACK/NACK bits) may be changed according to whether or not a D2D transmission subframe is present. Specifically, when the D2D link is not present in the above-described example, UE2 can transmit only ACK/NACK information about the PDSCH transmitted in subframe n1 in subframe n3. However, when the D2D link is present (or possibility of D2D link transmission is set by the eNB), UE2 needs to transmit ACK/NACK information regarding the signals received in subframes n1 and n2 in subframe n3.

FIG. 14 illustrates exemplary transmission of ACK/NACK information for D2D transmission according to the present invention. FIG. 14 assumes a case in which a D2D link is established on uplink in the case of an FDD system, timing (i.e. subframe n1) at which a PDSCH is transmitted from the eNB to UE2 corresponds to timing (i.e. subframe n2) at which D2D data is transmitted from UE1 to UE2, and ACK/NACK signals for the signals in subframes n1 and n2 are transmitted in subframe n3.

If a D2D link is not present, as illustrated in FIG. 14(a), ACK/NACK (or A/N) for transmission on a single DL subframe (subframe n1) can be transmitted in UL subframe n3(=n1+4).

In subframe n2 (=n1) in which a D2D link is activated, as illustrated in FIG. 14(b), UE2 can receive the PDSCH from the eNB through a DL band and, simultaneously, receive the D2D data from UE1 through a UL band, and thus ACK/NACK information about a plurality of subframes (i.e. subframe n1 in which the PDSCH is transmitted and subframe n2 in which the D2D data is transmitted) can be transmitted in subframe n3 (=n1+4) after the lapse of 4 ms from subframe n2.

FIG. 14(c) illustrates a method of transmitting ACK/NACK information with respect to transmission through a fixed number of subframes in a single UL subframe at all times irrespective of presence or absence of D2D link transmission. In this case, operation of a UE to transmit ACK/NACK information can be simply defined. When ACK/NACK information for transmission in a single subframe is transmitted (FIG. 14(a)) or ACK/NACK information for transmission in two subframes (FIG. 14(b)) is transmitted based on presence or absence of a D2D link, a rule for ACK/NACK bundling, channel selection or joint encoding needs to be additionally defined, complicating UE operation. However, if only ACK/NACK information for transmission in a single subframe is transmitted in UL subframe n3 at all times irrespective of whether D2D link transmission is performed or not, the rule with respect to ACK/NACK bundling, channel selection or joint encoding can be used without change.

To achieve this, the eNB can prevent scheduling of PDSCH transmission to UE2 in a DL subframe related to ACK/NACK transmission in subframe n3 and signal information about the DL subframe to UE2. For example, the eNB can signal the information in the form of a bitmap indicating the DL subframe in which PDSCH transmission is not performed. If D2D link transmission is performed in subframe n2, as illustrated in FIG. 14(c), the eNB can determine that PDSCH transmission is not carried out in subframe n1 and signal this to UE2. Accordingly, UE2 can transmit ACK/NACK information for transmission in a single subframe (i.e. subframe n2) to the eNB through subframe n3 all the time.

The principle of the present invention, described through the above example, can be equally applied to a system that needs to transmit a plurality of ACKs/NACKs in a single uplink subframe even when a D2D link is not present since carrier aggregation and/or TDD is applied. That is, when a UE transmits N ACK/NACK signals for PDSCH signals received through one or more subframes and/or one or more carriers (or cells) in a single uplink subframe, if the UE needs to additionally transmit ACK/NACK information for a D2D link, the UE can simultaneously transmit the ACK/NACK signals for the PDSCH signals and the ACK/NACK signal for the D2D link using the above-described method. Specifically, the UE can transmit N+1 ACK/NACK signals corresponding to the sum of the ACK/NACK signals for the PDSCH signals and the ACK/NACK signal for the D2D link through ACK/NACK bundling, channel selection or joint encoding. In addition, the UE can transmit a maximum of N ACK/NACK signals in a corresponding uplink subframe by limiting PDSCH signal transmission (e.g. limiting the number of ACK/NACK signals to less than N−1 when the D2D link is activated and thus ACK/NACK for the D2D link needs to be transmitted).

A time when ACK/NACK information for a signal received through the D2D link is transmitted may be determined by one of the following methods.

Method 1) When a PDSCH is transmitted from an eNB in a DL subframe corresponding to subframe n, ACK/NACK information for a D2D signal received in subframe n can be transmitted in a subframe scheduled to transmit ACK/NACK information for the PDSCH. For example, k=8 since a UL HARQ process has a period of 8 ms in an LTE FDD system.

Method 2) ACK/NACK information for a D2D signal received in subframe n may be transmitted in subframe n+m. Here, m can be determined as a minimum integer that makes subframe n+m correspond to a UL subframe, from among integers equal to or greater than a predetermined value (e.g. 4 ms which is a unit processing time in 3GPP LTE) to ensure decoding time for the received signal.

Method 3) ACK/NACK information for a signal received in subframe n may be transmitted in subframe n+m while piggybacking on a PUSCH transmitted from UE2. Here, m can be determined as a minimum integer that makes subframe n+m correspond to a UL subframe scheduled to transmit the PUSCH, from among integers equal to or greater than a predetermined value (e.g. 4 ms which is a basic processing time in 3GPP LTE) to ensure decoding time for the received signal.

4-2. CSI Transmission with Respect to D2D Link

The following description is applicable to D2D link detection result reporting in step S1350 of FIG. 13 and/or reporting of CSI about the D2D link in step S1390 of FIG. 13.

A device (e.g. UE2 of FIG. 13) that receives D2D data from a device (e.g. UE1 of FIG. 13) that transmits the D2D data on a D2D link can report channel state information (CSI) about the D2D link to the eNB for transmit power control and MCS in order to control transmit power of D2D data transmission and select an MCS to be applied to D2D data transmission. The eNB can determine parameters to be applied to D2D data transmission in consideration of the CSI received from UE2 and provide scheduling information for D2D transmission to UE1 and/or UE2. Accordingly, UE1 can transmit data to UE2 according to the scheduling information determined by the eNB on the basis of feedback from UE2.

The eNB can transmit a CSI report request to UE2 for feedback of the CSI about the D2D link. While the CSI report request in conventional eNB-to-UE communication is a control signal for triggering reporting of CSI on a downlink resource by a UE, the CSI report request with respect to the D2D link in the present invention can be defined as a control signal for triggering reporting of CSI on an uplink resource from UE1 to UE2. That is, while CSI is calculated on the assumption that downlink transmission is performed at a specific time and/or in a specific frequency resource (which may be called a CSI reference resource) in a legacy system, UE2 can determine an uplink resource as a CSI reference resource and calculate/determine CSI based on uplink transmission of UE1 in the CSI reference resource in the present invention. Specifically, UE2 can calculate/determine CSI about a corresponding uplink resource on the basis of a UL DMRS, SRS or PRACH preamble transmitted on the corresponding uplink resource from UE1.

Figure 15:
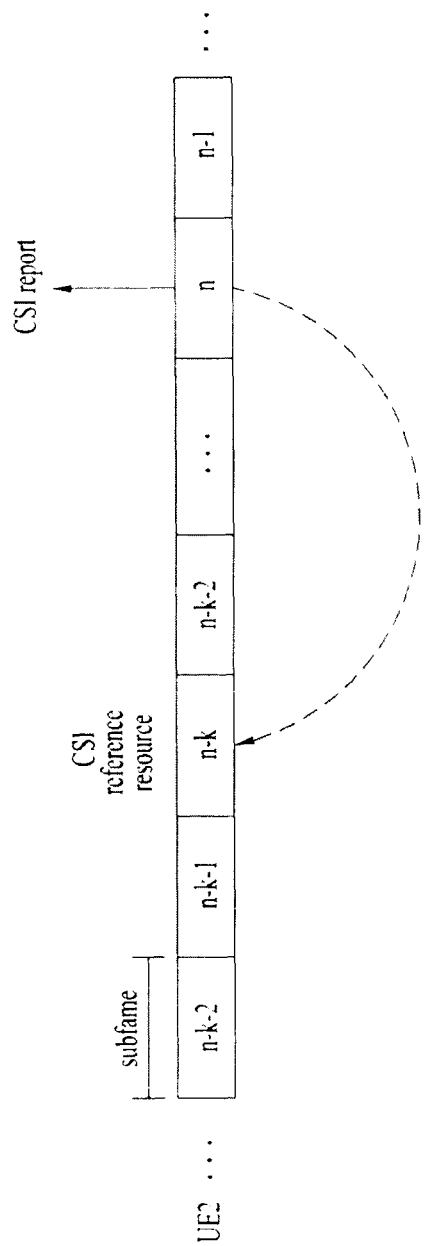
FIG. 15 illustrates CSI reference resource configuration.

FIG. 15 illustrates an example of determining a CSI reference resource according to the present invention. As shown in FIG. 15, a CSI reference resource for calculating CSI in subframe n can be determined as subframe n−k. Subframe n−k can be set to an uplink resource and k can be determined by one of the following methods.

Method 1) k may be set to an integer that makes subframe n−k correspond to a latest UL subframe belonging to the same UL HARQ process as the UL HARQ process to which subframe n belongs. In this case, it can be assumed that channel environments (e.g. interference applied to an uplink resource) are similar in the same UL HARQ process.

Method 2) k may be set to a minimum integer from among integers that make subframe n−k become a UL subframe corresponding to or after a DL subframe in which a CSI report request for triggering a CSI report in subframe n is received on the basis of the DL subframe. Simultaneously, k can be determined as a predetermined minimum value (e.g. 4 ms which is the unit processing time in 3GPP LTE) in order to ensure CSI calculation time. In this case, since the CSI reference resource is present when the CSI report request is received or after the CSI report request reception time, UE2 calculates CSI using the CSI reference resource after receiving the CSI report request. Accordingly, unnecessary CSI calculation can be omitted. That is, it is possible to eliminate calculation of CSI about a resource present prior to reception of the CSI report request when the CSI reference resource is determined as a resource prior to the CSI report request reception time.

Method 3) k may be set to a minimum integer that makes subframe n−k correspond to a UL subframe. Simultaneously, k may be set to a value greater than a predetermined minimum value (e.g. 4 ms which is the unit process time in 3GPP LTE) to ensure CSI calculation time. Here, subframe n−k may be a UL subframe corresponding to or prior to a DL subframe in which the CSI report request is received. In this case, a valid CSI reference resource can be set even when a period between the CSI report request reception time and CSI reporting time is insufficient. That is, a valid CSI reference resource does not exist when a UL subframe that ensures CSI calculation time is not present between a subframe in which the CSI report request is received and a subframe in which CSI is reported in the case of method 2, whereas the valid CSI reference resource can be configured at all times in the case of method 3.

Method 4) k may be set to a minimum integer that makes subframe n−k correspond to a subframe scheduled to transmit a specific signal of UE1, that is, a signal (e.g. a UL DMRS, SRS or PRACH preamble transmitted by UE1) used for CSI calculation by UE2. Simultaneously, k may be set to a value greater than a predetermined minimum value (e.g. 4 ms which is the unit processing time in 3GPP LTE) to ensure CSI calculation time. In this case, the CSI reference resource can be defined as a resource including a specific signal (e.g. UL DMRS, SRS or PRACH) of UE1 all the time.

To determine an uplink resource as a CSI reference resource and perform CSI feedback for D2D communication as described above, determination of the CSI reference resource and CSI feedback need to be signaled to a device that performs CSI feedback through higher layer signaling. For example, if a specific UE (e.g. UE2) can receive a signal from another UE (e.g. UE1) through an uplink resource (or a transmission mode in which the specific UE can receive a signal from the other UE is set), a UL subframe also needs to be considered as a valid CSI reference resource and the eNB can transmit a higher layer signal indicating that the UL subframe is set to a valid CSI reference resource to the specific UE.

To regard the UL subframe as the valid CSI reference resource, UE2 needs to measure interference in the UL subframe (on the assumption that a channel from UE1 can be estimated through a signal such as an SRS, CSI-RS, etc.). CSI calculation in a normal DL subframe (that is, CSI calculation with respect to DL transmission) is performed according to interference measurement that considers a signal, which is left after a CRS from a serving cell is canceled, as interference. However, a new interference measurement resource for CSI measurement in a UL resource is needed because a CRS is not present in a UL subframe.

Accordingly, the eNB can signal a resource element (RE) to be used for interference measurement to a UE through higher layer signaling. The RE used for interference measurement in a UL resource may be an RE on which an SRS is transmitted in the uplink resource. In this case, the eNB can signal a specific SRS of UE1 to UE2 and enable UE2 to use an RE on which the specific SRS of UE1 is transmitted for interference measurement.

The SRS may be a null SRS or zero transmission power SRS and can be used for interference measurement only. In this case, UE2 can directly measure an RE on which the null SRS or zero transmission power SRS is transmitted to measure interference.

Otherwise, the SRS may be an SRS transmitted by a specific UE (e.g. UE1). In this case, UE2 can measure a signal left after the SRS transmitted on an SRS transmission RE is canceled as interference. Here, UE2 may also estimate a channel from UE1 using the SRS.

While UE2 calculates CSI about the D2D link using the SRS from UE1 (or measures received signal strength or interference) in the above-described example, the present invention is not limited thereto and UE2 may measure the CSI about the D2D link using a specific signal (e.g. a UL DMRS or PRACH) transmitted by UE1 and known to both UE1 and UE2.

Transmit power from UE1 is different form transmit power from the eNB from the viewpoint of UE2. Even if a device operating as an eNB instantaneously performs operation of UE1 to transmit a signal to UE2 using a UL resource, this transmission is performed using the UL resource and thus transmit power different from transmit power of transmission carried out using a DL resource is used for transmission. This transmit power difference affects CSI calculation by UE2. Accordingly, the eNB can signal to UE2 a transmit power used by UE1 for transmission using a specific UL resource. Particularly, when the eNB performs operation of UE1, the eNB can inform UE2 of the transmit power of the D2D link by signaling a transmit power difference between a UL resource and a DL resource.

While D2D communication is performed in such a manner that UE1 performs normal uplink transmission (e.g. transmission of a PUCCH, PUSCH, SRS, UL DMRS, PRACH preamble, etc.) and UE2 receives a signal transmitted on uplink from another UE through an uplink resource, distinguished from legacy wireless communication systems, in the above-mentioned examples, the present invention is not limited thereto. That is, the present invention involves D2D communication performed in such a manner that UE1 performs downlink transmission (e.g. transmission of a PDCCH, PDSCH, CRS, CSI-RS, etc.), distinguished from legacy wireless communication systems, and UE2 receives a signal transmitted on downlink from another UE. In any case, D2D communication can be performed through an uplink resource of legacy wireless communication systems.

For example, when UE1 performs downlink transmission, UE2 can regard UE1 as a device corresponding to part of antenna ports of the eNB. That is, UE2 can be linked to the eNB to receive control information from the eNB and receive data from part (UE1) of the antenna ports of the eNB. Accordingly, UE2 can perform the same operation as operation of receiving downlink data from the eNB, which is transmitted on a time-frequency resource (which may be an uplink resource in legacy wireless communication systems) scheduled by the eNB, in the legacy wireless communication systems.

For the above-mentioned operation, the eNB can allocate a CRS or CSI-RS antenna port to UE1 through higher layer signaling and UE2 can measure CSI about the D2D link using a CRS or CSI-RS from UE1.

When D2D transmission of UE1 is performed on an uplink resource, the CRS or CSI-RS may be irregularly transmitted from UE1. This is because an uplink resource allocated to UE1 for D2D communication needs to be dynamically controlled according to traffic of UE1 since static allocation of a specific uplink resource to a specific UE may decrease network throughput. Accordingly, when UE1 transmits some or all CRS or CSI-RS on an uplink resource, it is necessary to dynamically signal presence or absence of the CRS or CSI-RS in the uplink resource to UE2.

For example, the eNB can embed an indicator indicating whether an RS is present or not in a specific resource in control information transmitted to UE2 through a physical layer control channel (e.g. PDCCH). While the RS is a CRS or CSI-RS transmitted from UE1, UE2 may recognize the RS as an RS from a specific antenna port of the eNB. Otherwise, when the eNB requests UE2 to feed back CSI (CSI on the D2D link from UE1) on a specific antenna port, UE2 can consider that an RS (CRS or CSI-RS) for CSI feedback is transmitted. When a CSI report request from the eNB is not present, UE2 can consider that an RS for the CSI report request is not transmitted. In any case, UE2 needs to measure the CSI on the D2D link from UE1 on the basis of an irregularly transmitted RS and thus it is necessary to newly define a CSI reference resource for CSI measurement.

For example, when CSI about downlink transmission (downlink transmission from UE1) through a specific antenna port needs to be reported in a specific uplink resource since the eNB transmits the CSI report request to UE2, an uplink resource in which downlink transmission (downlink transmission from UE1) through the specific antenna port is performed, which is scheduled when the CSI report request is transmitted, may be set to a CSI reference resource. Furthermore, when CSI on the D2D link, which is reported in subframe n, is calculated using subframe n−k as a CSI reference resource, k may be set to a minimum value from among values that make subframe n−k correspond to a subframe in which an RS (e.g. CRS or CSI-RS) from UE1 is transmitted and, at the same time, to a value greater than a predetermined minimum value (e.g. 4 ms which is the unit processing time in 3GPP LTE) to ensure CSI calculation time of UE2.

In D2D communication according to the present invention, the above-described embodiments can be independently applied or two or more thereof can be simultaneously applied and description of redundant parts is omitted for clarity.

Figure 16:
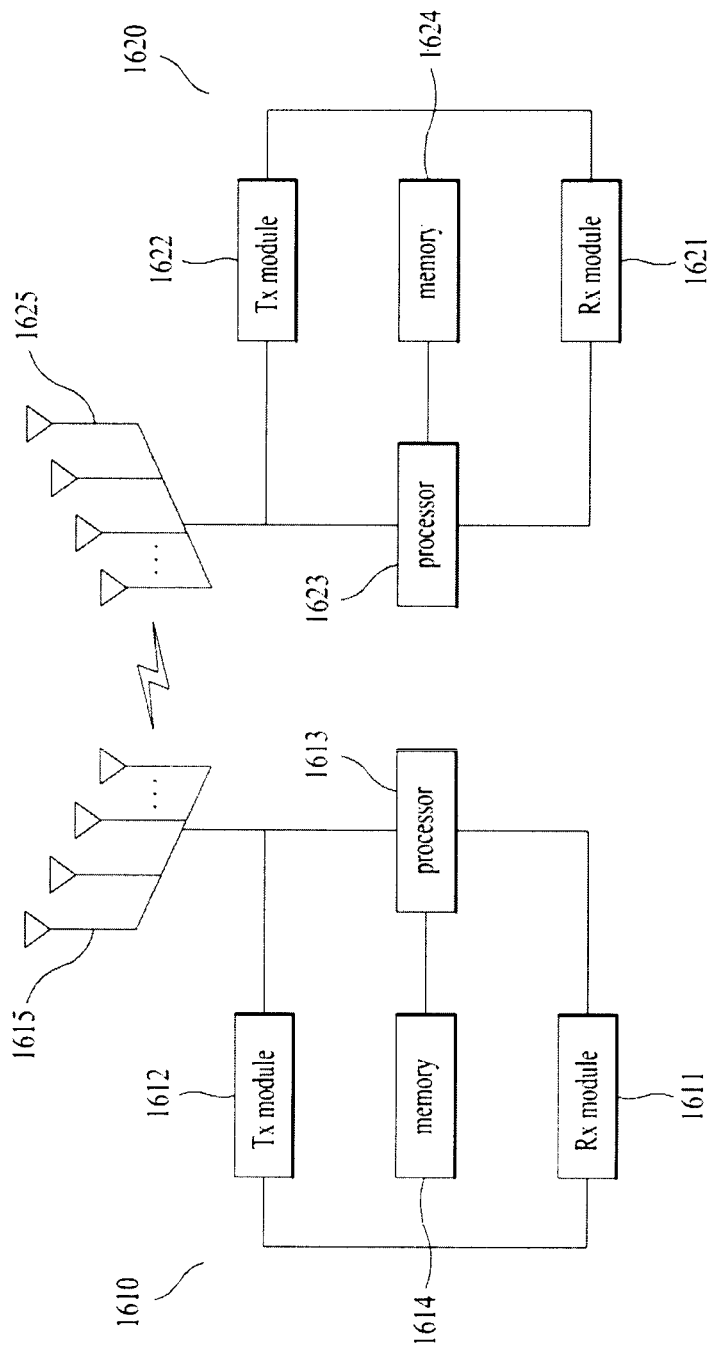
FIG. 16 illustrates configurations of a transmitter and a receiver according to the present invention.

FIG. 16 illustrates configuration of transceivers according to the present invention.

Referring to FIG. 16, a first transceiver 1610 according to the present invention may include a reception module 1611, a transmission module 1612, a processor 1613, a memory 1614 and a plurality of antennas 1615. The antennas 1615 refer to transceivers supporting MIMO transmission and reception. The reception module 1611 may receive signals, data and information from another device and/or an eNB. The transmission module 1612 may transmit signals, data and information to the other device and/or the eNB. The processor 1613 may control the overall operation of the first transceiver 1610.

The first transceiver may be configured to transmit a signal to another device (e.g. second transceiver). The processor 1613 of the first transceiver may be configured to request the eNB to allocate a resource for signal transmission to the second transceiver. In addition, the processor 1613 may be configured to receive scheduling information for signal transmission to the second transceiver from the eNB. Furthermore, the processor 1613 may be configured to transmit a signal to the second transceiver based on the received scheduling information. Here, the scheduling information may include information about an uplink resource for signal transmission from the first transceiver to the second transceiver.

The processor 1613 of the first transceiver may be configured to transmit a signal for channel state measurement in the second transceiver to the second transceiver. In addition, the first transceiver may perform transmission on the uplink resource according to a downlink channel/signal format. Otherwise, the first transceiver may perform transmission on the uplink resource according to an uplink channel/signal format.

In addition, the processor 1613 of the first transceiver 1610 may process information received by the first transceiver, information to be transmitted by the first transceiver, etc. and the memory 1614 may store the processed information for a predetermined time and may be replaced by a component such as a buffer (not shown).

A second transceiver 1620 according to the present invention may include a reception module 1621, a transmission module 1622, a processor 1623, a memory 1624 and a plurality of antennas 1625. The antennas 1625 refer to transceivers supporting MIMI transmission and reception. The reception module 1621 may receive signals, data and information from the eNB and/or another device. The transmission module 1622 may transmit signals, data and information to the eNB and/or the other device. The processor 1623 may control overall operation of the second transceiver 1620.

The second transceiver may be configured to receive a signal from another device (e.g. first transceiver). The processor 1623 of the second transceiver may be configured to receive, from the eNB, scheduling information about signal transmission from the first transceiver to the second transceiver. In addition, the processor 1623 may be configured to receive a signal from the first transceiver based on the received scheduling information. Here, the scheduling information may include information on an uplink resource used for the second transceiver to receive the signal from the first transceiver.

The processor 1623 of the second transceiver may be configured to transmit ACK/NACK information for a signal received from the first transceiver alone or along with ACK/NACK information for a signal received from the eNB to the eNB. Here, the second transceiver can transmit ACK/NACK information for a maximum of N received signals in a single uplink subframe. N can be set to a fixed value irrespective of whether a signal is received from the first transceiver or not. ACK/NACK information transmission time may be determined by one of the methods described in above embodiments of the present invention.

The processor 1623 of the second transceiver may be configured to receive a signal for channel state measurement from the first transceiver. Furthermore, the processor 1623 of the second transceiver may be configured to transmit measured CSI to the eNB. Here, a reference resource applied to CSI calculation can be determined by one of the methods described in the above embodiments.

When uplink transmission of the second transceiver is set in the uplink resource scheduled to receive a signal from the first transceiver, uplink transmission of the second transceiver may be dropped.

In addition, the processor 1623 of the second transceiver 1620 may process information received by the second transceiver 1620, information to be transmitted by the second transceiver 1620, etc. and the memory 1624 may store the processed information for a predetermined time and may be replaced by a component such as a buffer (not shown).

The first and second transceivers may transmit/receive signals to/from an eNB device (not shown). The eNB device may be configured to manage signal transmission from the first transceiver to the second transceiver. In addition, the eNB device may include a transmission module transmitting signals to the first and second transceivers, a reception module receiving signals from the first and second transceivers and a processor.

The processor of the eNB device may be configured to receive, from the first transceiver, a resource allocation request for signal transmission from the first transceiver to the second transceiver and to transmit, to the first and second transceivers, scheduling information for signal transmission from the first transceiver to the second transceiver. The scheduling information determined by the eNB device may include information on an uplink resource through which the first transceiver transmits a signal to the second transceiver.

The configurations of the eNB device and the transceivers may be implemented such that the above-described embodiments can be independently applied or two or more thereof can be simultaneously applied and description of redundant parts is omitted for clarity.

Description of the eNB device in FIG. 16 may be equally applied to a relay as a downlink transmitter or an uplink receiver and description of the transceiver may be equally applied to a UE or a relay as a downlink receiver or an uplink transmitter.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention can be applied to various mobile communication systems.

The invention claimed is:
1. A method for a second UE to receive a signal from a first UE, the method comprising:
receiving scheduling information for signal transmission from the first UE to the second UE from an eNB;
receiving a signal from the first UE on the basis of the scheduling information; and
transmitting ACK/NACK information for the signal received from the first UE to the eNB,
wherein the scheduling information includes information on an uplink resource used for the second UE to receive a signal from the first UE,
wherein ACK/NACK information for a maximum of N signals received by the second UE is transmitted on a single uplink subframe, and
wherein N is a fixed value in both cases in which the ACK/NACK information for the signal received from the first UE is transmitted in the single uplink subframe and a case in which the ACK/NACK information for the signal received from the first UE is not transmitted in the single uplink subframe.

2. The method according to claim 1, further comprising:
receiving from the first UE a signal for measuring the state of a channel from the first UE; and
transmitting channel state information to the eNB.

3. The method according to claim 2, wherein, when the channel state information is transmitted in a subframe n, a channel state information reference resource is set to a latest uplink subframe belonging to the same uplink HARQ process as that to which the subframe n belongs from among subframes prior to the subframe n, a latest uplink subframe from among subframes a predetermined process time in advance of the subframe n, a latest uplink subframe from among subframes a predetermined process time in advance of the subframe n and after a subframe in which control information for requesting transmission of the channel state information is received, or a latest subframe scheduled to transmit the signal for measuring the state of the channel from the first UE from among subframes a predetermined process time in advance of the subframe n.

4. The method according to claim 1, wherein the ACK/NACK information for the signal received from the first UE is transmitted to the eNB along with ACK/NACK information for a signal received from the eNB.

5. The method according to claim 1, wherein, when the signal from the first UE is received in a subframe n, the ACK/NACK information for the signal received from the first UE is transmitted in a subframe in which ACK/NACK information for downlink data from the eNB is transmitted when the downlink data is received from the eNB in the subframe n, an initial uplink subframe from among subframes after a predetermined process time from the subframe n, or an initial subframe scheduled to transmit uplink data from among subframes after a predetermined process time from the subframe n.

6. The method according to claim 1, wherein, when uplink transmission of the second UE is set in the uplink resource, uplink transmission of the second UE is dropped.

7. A method for a first user equipment (UE) to perform device-to-device (D2D) communication, the method comprising:
transmitting, to an eNB, a scheduling request;
receiving an uplink grant in response to the scheduling request;
reporting, to the eNB, information including an identifier of a specific D2D communication destination which is specified by the first UE as a D2D recipient and an amount of D2D communication data in a buffer of the first UE, based on the uplink grant received after transmitting the scheduling request;

receiving, from the eNB, scheduling information indicating an uplink resource for the D2D communication, wherein one or more uplink resources are allocated based on the amount of D2D communication data in the buffer and the D2D communication destination corresponding to the identifier transmitted to the eNB; and transmitting, by the first UE, a D2D signal including the D2D communication data of the first UE to the D2D communication destination using the allocated uplink resources, wherein the first UE has a UE identifier (UE ID) for the D2D communication and a UE ID for UE-to-eNB communication, and wherein the scheduling information is masked by the UE ID for the D2D communication.

8. The method according to claim 7, wherein one or more of a physical uplink control channel (PUCCH), a physical uplink shared channel (PUSCH), an uplink modulation reference signal (UL DMRS), a sounding reference signal (SRS) and a physical random access channel (PRACH) preamble is transmitted on the uplink resource from the first UE to the D2D communication destination.

9. The method according to claim 7, wherein one or more of a physical downlink control channel (PDCCH), a physical downlink shared channel (PDSCH), a cell-specific reference signal and a channel state information-reference signal (CSI-RS) is transmitted on the uplink resource from the first UE to the D2D communication destination.

10. The method according to claim 7, wherein the transmitted information further includes an indication that it is a request for the D2D communication.

11. The method of according to claim 7, further comprising:
dropping one of the D2D communication and an UE-to-eNB communication based on a predetermined priority when the D2D communication collides with the UE-to-eNB communication.

12. The method of according to claim 7, wherein the scheduling request is transmitted in a random access manner.

13. The method of claim 7, further comprising:
receiving, from the eNB, a D2D link detection signal configuration indicating a resource and a timing; and
transmitting a D2D link detection signal based on the resource and the timing indicated by the D2D link detection signal configuration.

14. The method of claim 7, wherein the first UE transmits the D2D signal using a modulation and coding scheme (MCS) which is determined by the eNB.

15. The method of claim 7, wherein a D2D signal transmission power of the first UE is controlled by the eNB.

16. A method for an eNB to support device-to-device (D2D) communication, the method comprising:
receiving, from a user equipment (UE), a scheduling request;
transmitting an uplink grant in response to the scheduling request;
receiving from the UE information including an identifier of a specific D2D communication destination which is specified by the UE as a D2D recipient and an amount of D2D communication data in a buffer of the UE, based on the uplink grant transmitted after receiving the scheduling request;
estimating an uplink resource for D2D communication to be allocated to the UE based on the information, wherein the estimated uplink resource is allocated based on the amount of D2D communication data in the buffer of the UE and the D2D communication destination corresponding to the identifier received from the UE; and
transmitting to the UE scheduling information indicating the uplink resource allocated for the D2D communication,
wherein the UE has a UE identifier (UE ID) for the D2D communication and a UE ID for UE-to-eNB communication, and
wherein the scheduling information is masked by the UE ID for the D2D communication.

17. A transceiver for receiving a signal from another device, comprising:
a transmission module for transmitting a signal to an eNB;
a reception module for receiving signals from the eNB and the other device; and
a processor for controlling the transceiver including the transmission module and the reception module,
wherein the processor is configured to receive from the eNB scheduling information for signal transmission from the other device to the transceiver, to receive a signal from the other device on the basis of the scheduling information and to transmit ACK/NACK information for the signal received from the other device to the eNB,
wherein the scheduling information includes information on an uplink resource used for the transceiver to receive a signal from the other device,
wherein ACK/NACK information for a maximum of N signals received by the transceiver is transmitted on a single uplink subframe, and
wherein N is a fixed value in both cases in which the ACK/NACK information for the signal received from the first UE is transmitted in the single uplink subframe and a case in which the ACK/NACK information for the signal received from the first UE is not transmitted in the single uplink subframe.

18. A user equipment (UE) for performing device-to-device (D2D) communication comprising:
a transmitter that transmits, to an eNB, a scheduling request and information including an identifier of a specific D2D communication destination which is specified by the UE as a D2D recipient and an amount of D2D communication data in a buffer of the UE based on an uplink grant received after transmitting the scheduling request;
a receiver that receives the uplink grant in response to the scheduling request, and receives, from the eNB, scheduling information indicating an uplink resource for the D2D communication, wherein one or more uplink resources are allocated based on the amount of D2D communication data in the buffer and the D2D communication destination corresponding to the identifier transmitted to the eNB; and
a processor that performs the D2D communication by controlling the transmitter to transmit a D2D signal including the D2D communication data of the UE to the D2D communication destination using the allocated uplink resources,
wherein the UE has a UE identifier (UE ID) for the D2D communication and a UE ID for UE-to-eNB communication, and
wherein the scheduling information is masked by the UE ID for the D2D communication.

19. An eNB device supporting device-to-device (D2D) communication comprising:

a receiver that receives, from a user equipment (UE), a scheduling request and information including an identifier of a specific D2D communication destination which is specified by the UE as a D2D recipient and an amount of D2D communication data in a buffer of the UE, based on an uplink grant transmitted after receiving the scheduling request;

a processor that estimates an uplink resource for D2D communication to be allocated to the UE based on the amount of D2D communication data in the buffer and the D2D communication destination corresponding to the identifier received from the UE; and a transmitter that transmits the uplink grant in response to the scheduling request and transmits, to the UE, scheduling information indicating the uplink resource allocated for the D2D communication, wherein the UE has a UE identifier (UE ID) for the D2D communication and a UE ID for UE-to-eNB communication, and wherein the scheduling information is masked by the UE ID for the D2D communication.

* * * * *